(12) United States Patent
Liang et al.

(10) Patent No.: US 7,632,075 B2
(45) Date of Patent: Dec. 15, 2009

(54) EXTERNAL PROFILE FOR TURBINE BLADE AIRFOIL

(75) Inventors: George Liang, Palm City, FL (US); Anthony J. Malandra, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 450 days.

(21) Appl. No.: 11/707,190

(22) Filed: Feb. 15, 2007

(65) Prior Publication Data

US 2008/0273984 A1    Nov. 6, 2008

(51) Int. Cl.
*F01D 5/14* (2006.01)

(52) U.S. Cl. .............................. 416/223 A; 416/DIG. 2

(58) Field of Classification Search ................. 415/191; 416/223 A, 243, DIG. 2, DIG. 5
See application file for complete search history.

(56) References Cited

U.S. PATENT DOCUMENTS

| | | | |
|---|---|---|---|
| 6,450,770 B1 | 9/2002 | Wang et al. | |
| 6,461,110 B1 | 10/2002 | By et al. | |
| 6,739,839 B1 | 5/2004 | Brown et al. | |
| 6,779,977 B2* | 8/2004 | Lagrange et al. | 416/223 A |
| 6,910,868 B2 | 6/2005 | Hyde et al. | |
| 7,014,424 B2 | 3/2006 | Cunha et al. | |
| 7,094,034 B2* | 8/2006 | Fukuda et al. | 416/223 A |
| 7,534,091 B2* | 5/2009 | Ravanis et al. | 416/223 A |
| 7,537,433 B2* | 5/2009 | Girgis et al. | 416/223 A |

* cited by examiner

*Primary Examiner*—Igor Kershteyn

(57) ABSTRACT

A turbine blade including an airfoil having a pressure sidewall and a suction sidewall joined together along an upstream leading edge and a downstream trailing edge. The leading edge and trailing edge are formed as substantially straight edges, and portions of the pressure sidewall and suction sidewall adjacent the trailing edge form substantially planar surfaces. The airfoil has an uncoated nominal profile substantially in accordance with Cartesian coordinate values of X, Y and Z set forth in Table 1 wherein Z represents a perpendicular distance from a plane normal to a radius of a turbine centerline and containing the X and Y values with the Z value commencing at zero in the X, Y plane at a radially innermost aerodynamic section of the airfoil, and X and Y represent coordinate values defining the airfoil profile at each distance Z which, when connected by smooth continuing arcs, define profile sections at each distance Z.

16 Claims, 4 Drawing Sheets

US 7,632,075 B2

EXTERNAL PROFILE FOR TURBINE BLADE AIRFOIL

FIELD OF THE INVENTION

The present invention relates to a turbine blade for a gas turbine stage and, more particularly, to a first stage turbine blade airfoil profile.

BACKGROUND OF THE INVENTION

In a turbomachine, such as a gas turbine engine, air is pressurized in a compressor then mixed with fuel and burned in a combustor to generate hot combustion gases. The hot combustion gases are expanded within the turbine section where energy is extracted to power the compressor and to produce useful work, such as powering a propeller for an aircraft in flight or turning a generator to produce electricity. The hot combustion gas travels through a series of turbine stages. A turbine stage may include a row of stationary vanes followed by a row of rotating turbine blades, where the turbine blades extract energy from the hot combustion gas for powering the compressor and providing output power. Since the turbine blades are directly exposed to the hot combustion gas, they are typically provided with internal cooling circuits which channel a coolant, such as compressor bleed air, through the airfoil of the blade and through various film cooling holes around the surface thereof.

As turbine inlet temperatures increase and the pressure ratio across the turbine stage becomes higher, the cooling schemes for the first stage blades become more complicated. In particular, in order to enhance the cooling efficiency at the trailing edges of the blade airfoils, the cooling circuit configurations required for the trailing edges becomes increasingly intricate. As a consequence, the ceramic cores that are used to form the trailing edge cooling circuits have become more complex and fragile, with an associated complexity in the manufacturing process.

Accordingly, there is a need for a turbine blade airfoil design that is conducive to formation of intricate airfoil cooling circuits and which may provide an increase in the production yield during blade manufacture.

SUMMARY OF THE INVENTION

In accordance with one aspect of the invention, a turbine blade is provided including an airfoil. The airfoil has an uncoated nominal profile substantially in accordance with Cartesian coordinate values of X, Y and Z set forth in millimeters in Table 1 wherein Z is a perpendicular distance from a plane containing the X and Y values with the Z value commencing at zero in the X, Y plane at a radially innermost aerodynamic section of the airfoil. The X and Y coordinate values define the airfoil profile at each distance Z which, when connected by smooth continuing arcs, define profile sections at each distance Z. The profile sections at the Z distances may be joined smoothly with one another to form the complete airfoil shape, wherein the airfoil shape is defined in an envelope within about 1% of a maximum Z value in a direction normal to any airfoil surface location.

In accordance with another aspect of the invention, a turbine blade is provided including an airfoil. The airfoil has an uncoated nominal profile substantially in accordance with Cartesian coordinate values of X, Y and Z set forth in Table 1 wherein the X, Y and Z coordinate values represent scaled values and Z represents a perpendicular distance from a plane containing the X and Y values with the Z value commencing at zero in the X, Y plane at a radially innermost aerodynamic section of the airfoil. The X and Y coordinate values define the airfoil profile at each distance Z which, when connected by smooth continuing arcs, define profile sections at each distance Z. The profile sections at the Z distances may be joined smoothly with one another to form the complete airfoil shape.

In accordance with a further aspect of the invention, a turbine blade is provided comprising an airfoil including an airfoil outer wall extending radially outwardly from a blade root. A blade tip surface is located at an end of the airfoil distal from the root. The airfoil further includes a pressure sidewall and a suction sidewall joined together at chordally spaced apart leading and trailing edges of the airfoil. A trailing edge portion comprises the trailing edge and adjacent portions of the pressure sidewall and suction sidewall defined by a spanwise loci of points located in a substantially straight formation, from a location adjacent the blade root to a location adjacent the blade tip surface. The spanwise loci of points defining the trailing edge portion is substantially in accordance with Cartesian coordinate values of X, Y and Z as set forth by point locations 1-11 and 162-199 at each value of coordinate Z in Table 1, wherein the X, Y and Z coordinate values represent scaled values and Z is a perpendicular distance from a plane containing the X and Y values with the Z value commencing at zero in the X, Y plane at a radially innermost aerodynamic section of the airfoil. The X and Y coordinate values define the profile of the trailing edge portion at each distance Z which, when connected by smooth continuing arcs, define trailing edge portion profile sections at each distance Z. The profile sections at the Z distances may be joined smoothly with one another to form the complete trailing edge portion shape.

In addition, it may be noted that the coordinate values provided for the present airfoil, or portions of an airfoil, may be scaled up or scaled down geometrically to incorporate the features of the present invention into airfoils other than those explicitly described herein.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
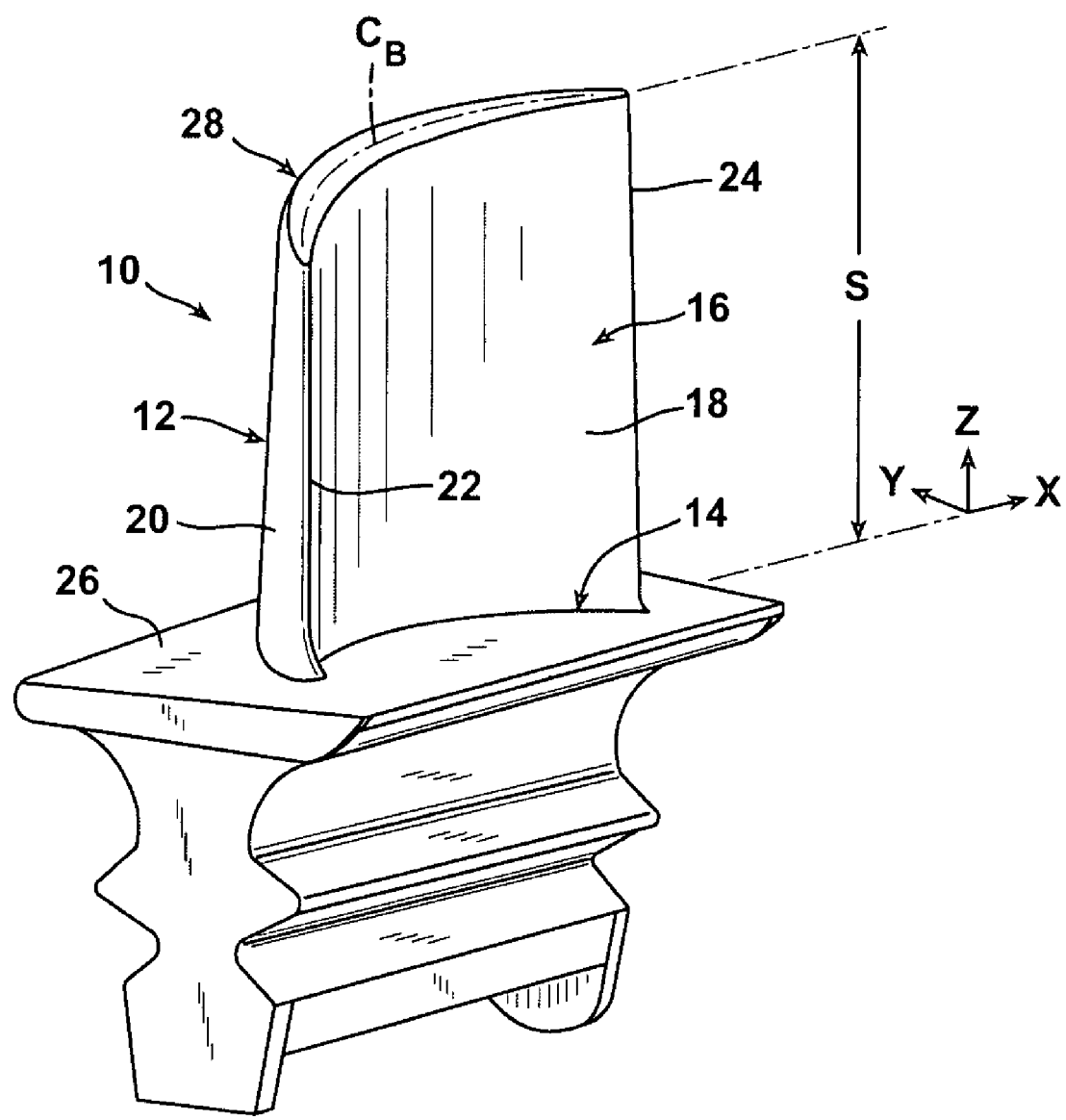
FIG. 1 is a perspective view of a turbine blade taken from a leading edge side of the turbine blade, including an airfoil formed in accordance with the present invention.
Figure 2:
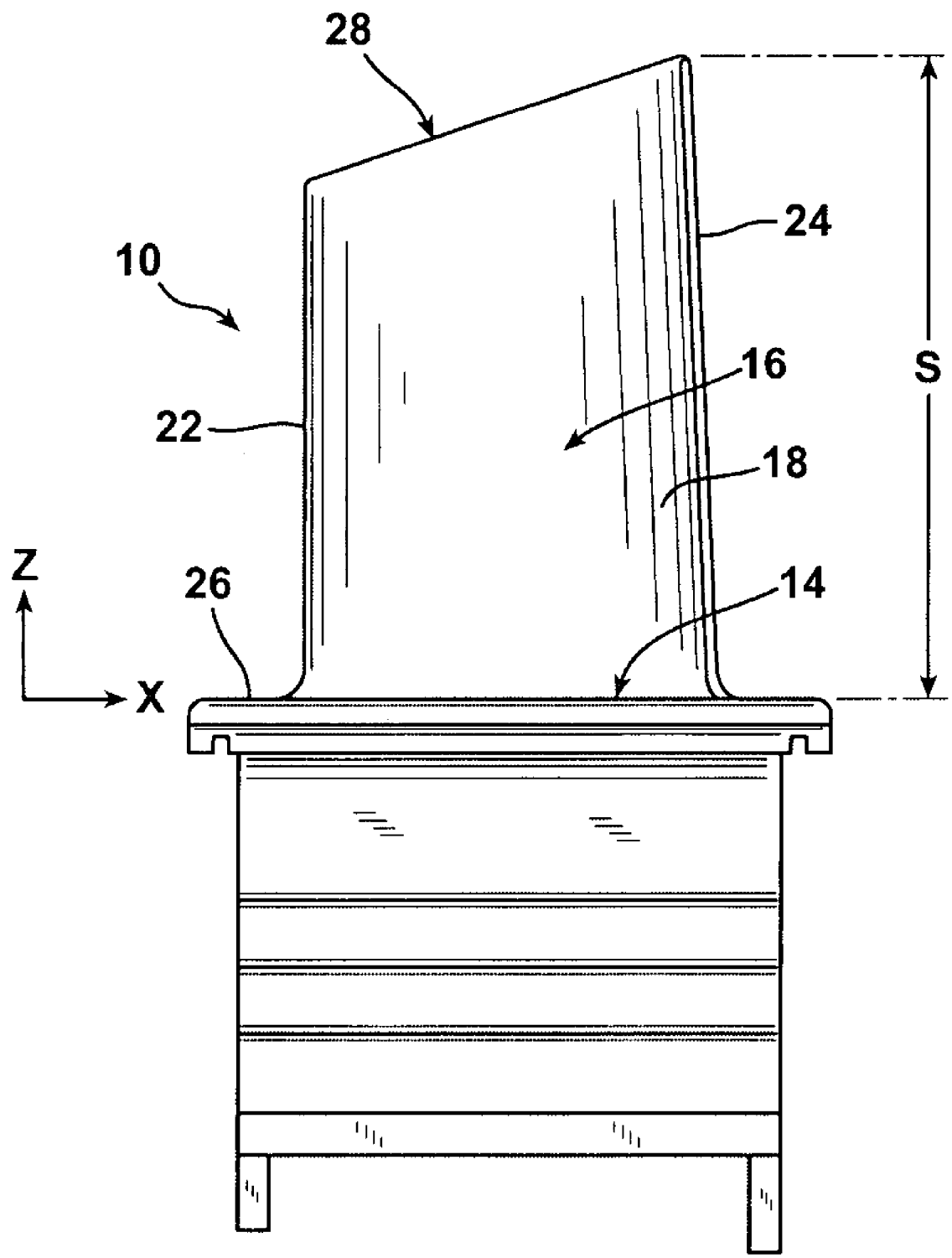
FIG. 2 is a side elevational view of the turbine blade shown in FIG. 1.
Figure 3:
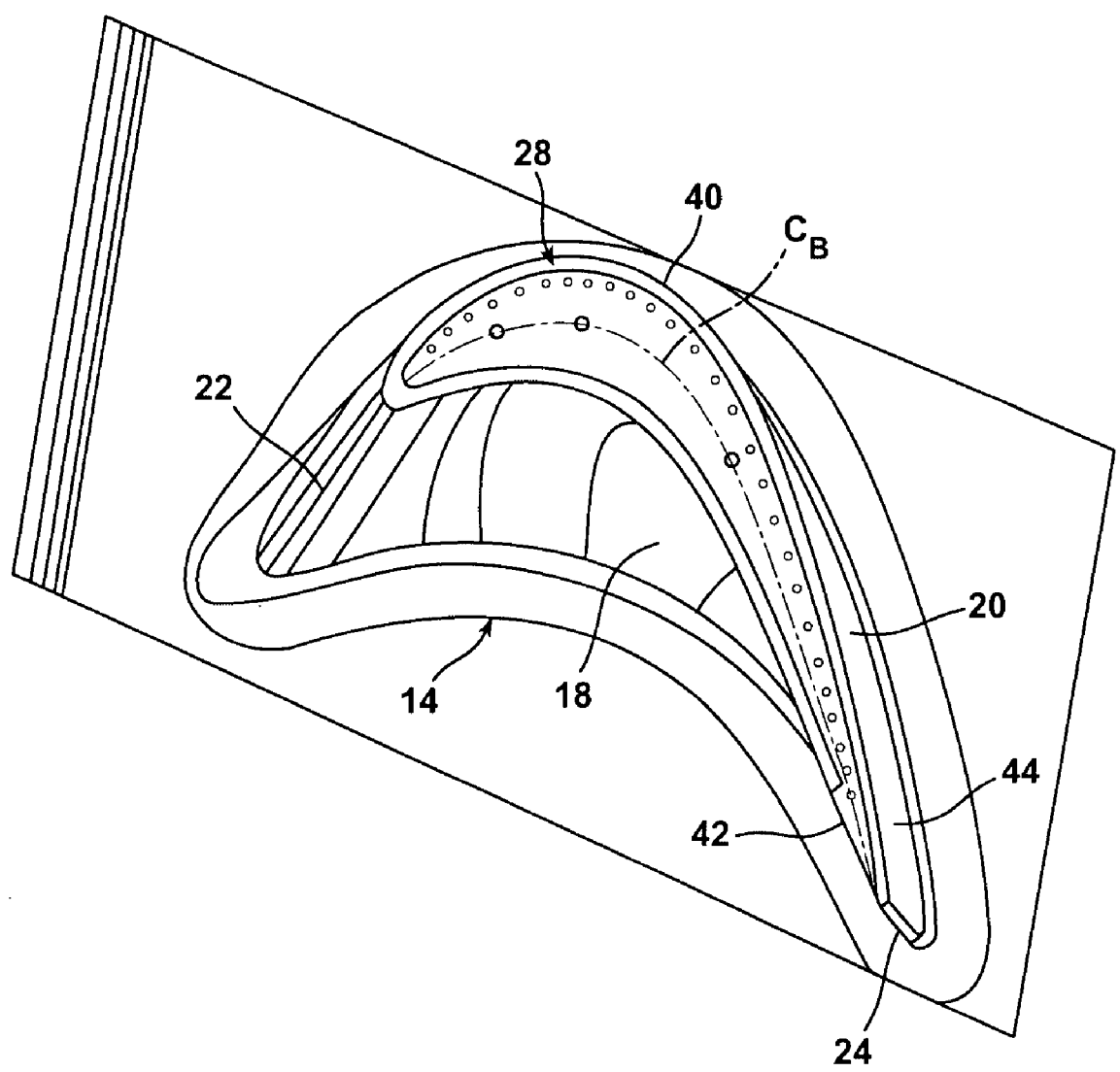
FIG. 3 is a plan view of the turbine blade.

Referring to FIGS. 1 and 2, an exemplary turbine blade 10 for the first stage in a gas turbine engine is illustrated. The blade 10 includes an airfoil 12 and a root 14 which is used to conventionally secure the blade 10 to a rotor disk of the engine for supporting the blade 10 in the working medium flow path of the turbine where working medium gases exert motive forces on the surfaces thereof. The airfoil 12 has an outer wall 16 comprising a pressure sidewall 18 and a suction sidewall 20. The pressure and suction sidewalls 18, 20 are joined together along an upstream leading edge 22 and a downstream trailing edge 24, where the leading and trailing edges 22, 24 are spaced axially or chordally from each other with respect to a chordal direction $C_B$. The airfoil 12 extends radially along a longitudinal or radial direction of the blade 10, defined by a span S of the airfoil 12, from a radially inner airfoil platform 26 to a radially outer blade tip 28. The blade 10 may be formed with a conical blade tip 28 which, as is illustrated in greater detail in FIG. 3, may be formed as a squealer tip section having a squealer tip rail 40. However, it should be understood that the turbine blade 10 of the present invention is not limited to any particular construction for the outer blade tip 28.

The airfoil 12 is described in Table I below with reference to a Cartesian coordinate system that has orthogonally related X, Y and Z axes (FIG. 2) with the Z axis extending perpendicular to a radius from the centerline of the turbine rotor, i.e., normal to a plane containing the X and Y values, and generally parallel to the span S of the airfoil 12. The Z coordinate values have an origin or zero value at a radial location coinciding with the X, Y plane at the radially innermost aerodynamic section of the airfoil 12, i.e., adjacent the blade root 14. The X axis lies parallel to the turbine rotor centerline, i.e., the rotary axis. The profile of the airfoil 12 is defined by the X and Y coordinate values, located at point locations, N, at selected locations in the Z direction normal to the X, Y plane. Each profile section at each distance Z is determined by connecting the X and Y values at the point locations, N, with smooth, continuous arcs. Similarly, the surface profiles at the various surface locations between the distances Z are connected smoothly to one another to form the airfoil. The tabular values given in Table I below are in millimeters and represent airfoil profiles at ambient, non-operating or non-hot conditions and are for an uncoated airfoil. The sign convention assigns a positive value to the value Z, and positive and negative values for the X and Y coordinate values are determined relative to an origin of the coordinate system, as is typical of a Cartesian coordinate system.

The values presented in Table I are generated and shown for determining the profiles of the airfoil 12. Further, there are typical manufacturing tolerances as well as coatings which are typically accounted for in the actual profile of the airfoil 12. Accordingly, the values for the profile given in Table I correspond to nominal dimensional values for an uncoated airfoil 12. It will therefore be appreciated that typical manufacturing tolerances, i.e., plus or minus values and coating thicknesses, are additive to the X and Y values given in Table I below. Accordingly, a distance of approximately ±1% of a maximum airfoil height, in a direction normal to any surface location along the airfoil profile, defines an airfoil profile envelope for the airfoil illustrated herein.

The coordinate values given in Table I below in millimeters provide the preferred nominal profile envelope.

TABLE I

| N | X | Y | Z |
|---|---|---|---|
| 1 | 287.788 | −57.790 | 0.00 |
| 2 | 287.540 | −57.157 | 0.00 |
| 3 | 287.251 | −56.420 | 0.00 |
| 4 | 287.035 | −55.870 | 0.00 |
| 5 | 286.675 | −54.957 | 0.00 |
| 6 | 286.272 | −53.941 | 0.00 |
| 7 | 285.979 | −53.205 | 0.00 |
| 8 | 285.505 | −52.015 | 0.00 |
| 9 | 284.986 | −50.721 | 0.00 |
| 10 | 284.616 | −49.801 | 0.00 |
| 11 | 284.023 | −48.334 | 0.00 |
| 12 | 283.386 | −46.764 | 0.00 |
| 13 | 282.935 | −45.659 | 0.00 |
| 14 | 282.221 | −43.917 | 0.00 |
| 15 | 281.460 | −42.073 | 0.00 |
| 16 | 280.925 | −40.786 | 0.00 |
| 17 | 280.083 | −38.772 | 0.00 |
| 18 | 279.190 | −36.656 | 0.00 |
| 19 | 278.566 | −35.190 | 0.00 |
| 20 | 277.586 | −32.907 | 0.00 |
| 21 | 276.550 | −30.525 | 0.00 |
| 22 | 275.829 | −28.882 | 0.00 |
| 23 | 274.696 | −26.338 | 0.00 |
| 24 | 273.498 | −23.699 | 0.00 |
| 25 | 272.660 | −21.889 | 0.00 |
| 26 | 271.342 | −19.099 | 0.00 |
| 27 | 270.417 | −17.192 | 0.00 |
| 28 | 268.958 | −14.261 | 0.00 |
| 29 | 267.402 | −11.253 | 0.00 |
| 30 | 266.305 | −9.208 | 0.00 |
| 31 | 264.561 | −6.088 | 0.00 |
| 32 | 262.685 | −2.914 | 0.00 |
| 33 | 261.353 | −0.774 | 0.00 |
| 34 | 259.218 | 2.461 | 0.00 |
| 35 | 256.897 | 5.705 | 0.00 |
| 36 | 255.234 | 7.860 | 0.00 |
| 37 | 252.542 | 11.057 | 0.00 |
| 38 | 249.585 | 14.163 | 0.00 |
| 39 | 247.469 | 16.133 | 0.00 |
| 40 | 244.175 | 18.811 | 0.00 |
| 41 | 240.747 | 21.125 | 0.00 |
| 42 | 238.399 | 22.451 | 0.00 |
| 43 | 234.812 | 24.102 | 0.00 |
| 44 | 231.183 | 25.345 | 0.00 |
| 45 | 228.762 | 25.947 | 0.00 |
| 46 | 225.160 | 26.521 | 0.00 |
| 47 | 221.632 | 26.728 | 0.00 |
| 48 | 219.340 | 26.681 | 0.00 |
| 49 | 216.010 | 26.367 | 0.00 |
| 50 | 212.824 | 25.802 | 0.00 |
| 51 | 210.787 | 25.305 | 0.00 |
| 52 | 207.873 | 24.410 | 0.00 |
| 53 | 206.025 | 23.728 | 0.00 |
| 54 | 203.398 | 22.600 | 0.00 |
| 55 | 200.941 | 21.369 | 0.00 |
| 56 | 199.396 | 20.506 | 0.00 |
| 57 | 197.217 | 19.161 | 0.00 |
| 58 | 195.199 | 17.776 | 0.00 |
| 59 | 193.941 | 16.838 | 0.00 |
| 60 | 192.182 | 15.422 | 0.00 |
| 61 | 190.569 | 14.007 | 0.00 |
| 62 | 189.573 | 13.070 | 0.00 |
| 63 | 188.191 | 11.683 | 0.00 |
| 64 | 186.939 | 10.329 | 0.00 |
| 65 | 186.172 | 9.449 | 0.00 |
| 66 | 185.120 | 8.170 | 0.00 |
| 67 | 184.177 | 6.947 | 0.00 |
| 68 | 183.608 | 6.165 | 0.00 |
| 69 | 182.846 | 5.043 | 0.00 |
| 70 | 182.178 | 3.994 | 0.00 |
| 71 | 181.776 | 3.341 | 0.00 |
| 72 | 181.231 | 2.435 | 0.00 |
| 73 | 180.782 | 1.607 | 0.00 |
| 74 | 180.548 | 1.092 | 0.00 |
| 75 | 180.302 | 0.379 | 0.00 |
| 76 | 180.205 | −0.051 | 0.00 |
| 77 | 180.174 | −0.260 | 0.00 |
| 78 | 180.157 | −0.476 | 0.00 |
| 79 | 180.155 | −0.697 | 0.00 |

TABLE I-continued

| N | X | Y | Z |
|---|---|---|---|
| 80 | 180.168 | −0.920 | 0.00 |
| 81 | 180.199 | −1.144 | 0.00 |
| 82 | 180.247 | −1.367 | 0.00 |
| 83 | 180.314 | −1.588 | 0.00 |
| 84 | 180.401 | −1.803 | 0.00 |
| 85 | 180.507 | −2.012 | 0.00 |
| 86 | 180.631 | −2.212 | 0.00 |
| 87 | 180.773 | −2.400 | 0.00 |
| 88 | 180.931 | −2.574 | 0.00 |
| 89 | 181.104 | −2.732 | 0.00 |
| 90 | 181.292 | −2.873 | 0.00 |
| 91 | 181.491 | −2.996 | 0.00 |
| 92 | 181.701 | −3.098 | 0.00 |
| 93 | 181.918 | −3.182 | 0.00 |
| 94 | 182.141 | −3.246 | 0.00 |
| 95 | 182.367 | −3.291 | 0.00 |
| 96 | 182.595 | −3.318 | 0.00 |
| 97 | 182.821 | −3.327 | 0.00 |
| 98 | 183.045 | −3.319 | 0.00 |
| 99 | 183.264 | −3.296 | 0.00 |
| 100 | 183.477 | −3.258 | 0.00 |
| 101 | 183.657 | −3.215 | 0.00 |
| 102 | 184.176 | −3.067 | 0.00 |
| 103 | 184.776 | −2.878 | 0.00 |
| 104 | 185.221 | −2.730 | 0.00 |
| 105 | 185.957 | −2.477 | 0.00 |
| 106 | 186.777 | −2.193 | 0.00 |
| 107 | 187.372 | −1.991 | 0.00 |
| 108 | 188.336 | −1.665 | 0.00 |
| 109 | 189.385 | −1.312 | 0.00 |
| 110 | 190.132 | −1.063 | 0.00 |
| 111 | 191.325 | −0.672 | 0.00 |
| 112 | 192.607 | −0.263 | 0.00 |
| 113 | 193.511 | 0.018 | 0.00 |
| 114 | 194.943 | 0.449 | 0.00 |
| 115 | 196.466 | 0.886 | 0.00 |
| 116 | 197.532 | 1.179 | 0.00 |
| 117 | 199.210 | 1.613 | 0.00 |
| 118 | 200.983 | 2.036 | 0.00 |
| 119 | 202.219 | 2.307 | 0.00 |
| 120 | 204.154 | 2.691 | 0.00 |
| 121 | 206.186 | 3.038 | 0.00 |
| 122 | 207.595 | 3.242 | 0.00 |
| 123 | 209.790 | 3.499 | 0.00 |
| 124 | 212.083 | 3.684 | 0.00 |
| 125 | 213.665 | 3.759 | 0.00 |
| 126 | 216.114 | 3.789 | 0.00 |
| 127 | 217.796 | 3.745 | 0.00 |
| 128 | 220.388 | 3.571 | 0.00 |
| 129 | 223.057 | 3.251 | 0.00 |
| 130 | 224.874 | 2.948 | 0.00 |
| 131 | 227.647 | 2.348 | 0.00 |
| 132 | 230.464 | 1.558 | 0.00 |
| 133 | 232.359 | 0.919 | 0.00 |
| 134 | 235.217 | −0.216 | 0.00 |
| 135 | 238.079 | −1.567 | 0.00 |
| 136 | 239.981 | −2.591 | 0.00 |
| 137 | 242.810 | −4.313 | 0.00 |
| 138 | 245.603 | −6.256 | 0.00 |
| 139 | 247.422 | −7.657 | 0.00 |
| 140 | 249.999 | −9.836 | 0.00 |
| 141 | 252.398 | −12.080 | 0.00 |
| 142 | 253.903 | −13.601 | 0.00 |
| 143 | 256.031 | −15.905 | 0.00 |
| 144 | 258.012 | −18.220 | 0.00 |
| 145 | 259.257 | −19.762 | 0.00 |
| 146 | 261.020 | −22.062 | 0.00 |
| 147 | 262.666 | −24.337 | 0.00 |
| 148 | 263.705 | −25.834 | 0.00 |
| 149 | 265.181 | −28.044 | 0.00 |
| 150 | 266.570 | −30.205 | 0.00 |
| 151 | 267.450 | −31.615 | 0.00 |
| 152 | 268.711 | −33.681 | 0.00 |
| 153 | 269.513 | −35.023 | 0.00 |
| 154 | 270.665 | −36.981 | 0.00 |
| 155 | 271.759 | −38.868 | 0.00 |
| 156 | 272.459 | −40.086 | 0.00 |
| 157 | 273.467 | −41.851 | 0.00 |
| 158 | 274.427 | −43.539 | 0.00 |
| 159 | 275.041 | −44.623 | 0.00 |
| 160 | 275.925 | −46.183 | 0.00 |
| 161 | 276.766 | −47.665 | 0.00 |
| 162 | 277.302 | −48.610 | 0.00 |
| 163 | 278.071 | −49.960 | 0.00 |
| 164 | 278.798 | −51.232 | 0.00 |
| 165 | 279.259 | −52.036 | 0.00 |
| 166 | 279.916 | −53.175 | 0.00 |
| 167 | 280.531 | −54.236 | 0.00 |
| 168 | 280.918 | −54.899 | 0.00 |
| 169 | 281.463 | −55.828 | 0.00 |
| 170 | 281.965 | −56.678 | 0.00 |
| 171 | 282.275 | −57.201 | 0.00 |
| 172 | 282.705 | −57.920 | 0.00 |
| 173 | 283.090 | −58.562 | 0.00 |
| 174 | 283.322 | −58.947 | 0.00 |
| 175 | 283.633 | −59.459 | 0.00 |
| 176 | 283.814 | −59.758 | 0.00 |
| 177 | 283.976 | −59.986 | 0.00 |
| 178 | 284.149 | −60.176 | 0.00 |
| 179 | 284.349 | −60.351 | 0.00 |
| 180 | 284.601 | −60.522 | 0.00 |
| 181 | 284.845 | −60.647 | 0.00 |
| 182 | 285.105 | −60.740 | 0.00 |
| 183 | 285.410 | −60.804 | 0.00 |
| 184 | 285.683 | −60.824 | 0.00 |
| 185 | 285.953 | −60.810 | 0.00 |
| 186 | 286.214 | −60.766 | 0.00 |
| 187 | 286.491 | −60.686 | 0.00 |
| 188 | 286.716 | −60.588 | 0.00 |
| 189 | 286.930 | −60.464 | 0.00 |
| 190 | 287.160 | −60.289 | 0.00 |
| 191 | 287.351 | −60.105 | 0.00 |
| 192 | 287.523 | −59.895 | 0.00 |
| 193 | 287.670 | −59.663 | 0.00 |
| 194 | 287.799 | −59.379 | 0.00 |
| 195 | 287.878 | −59.115 | 0.00 |
| 196 | 287.923 | −58.845 | 0.00 |
| 197 | 287.935 | −58.542 | 0.00 |
| 198 | 287.913 | −58.278 | 0.00 |
| 199 | 287.864 | −58.026 | 0.00 |
| 200 | 287.788 | −57.790 | 0.00 |
| 1 | 287.539 | −56.376 | 15.00 |
| 2 | 287.288 | −55.754 | 15.00 |
| 3 | 286.995 | −55.028 | 15.00 |
| 4 | 286.776 | −54.487 | 15.00 |
| 5 | 286.412 | −53.590 | 15.00 |
| 6 | 286.006 | −52.590 | 15.00 |
| 7 | 285.712 | −51.867 | 15.00 |
| 8 | 285.234 | −50.695 | 15.00 |
| 9 | 284.713 | −49.422 | 15.00 |
| 10 | 284.341 | −48.516 | 15.00 |
| 11 | 283.746 | −47.072 | 15.00 |
| 12 | 283.107 | −45.526 | 15.00 |
| 13 | 282.656 | −44.439 | 15.00 |
| 14 | 281.942 | −42.723 | 15.00 |
| 15 | 281.181 | −40.905 | 15.00 |
| 16 | 280.649 | −39.638 | 15.00 |
| 17 | 279.811 | −37.652 | 15.00 |
| 18 | 278.924 | −35.566 | 15.00 |
| 19 | 278.305 | −34.119 | 15.00 |
| 20 | 277.334 | −31.867 | 15.00 |
| 21 | 276.310 | −29.517 | 15.00 |
| 22 | 275.596 | −27.896 | 15.00 |
| 23 | 274.476 | −25.386 | 15.00 |
| 24 | 273.292 | −22.781 | 15.00 |
| 25 | 272.465 | −20.995 | 15.00 |
| 26 | 271.164 | −18.241 | 15.00 |
| 27 | 270.252 | −16.357 | 15.00 |
| 28 | 268.814 | −13.463 | 15.00 |
| 29 | 267.282 | −10.491 | 15.00 |
| 30 | 266.204 | −8.471 | 15.00 |
| 31 | 264.491 | −5.386 | 15.00 |
| 32 | 262.651 | −2.246 | 15.00 |
| 33 | 261.347 | −0.126 | 15.00 |

TABLE I-continued

| N | X | Y | Z |
|---|---|---|---|
| 34 | 259.260 | 3.080 | 15.00 |
| 35 | 256.996 | 6.300 | 15.00 |
| 36 | 255.376 | 8.443 | 15.00 |
| 37 | 252.760 | 11.630 | 15.00 |
| 38 | 249.888 | 14.742 | 15.00 |
| 39 | 247.836 | 16.728 | 15.00 |
| 40 | 244.642 | 19.446 | 15.00 |
| 41 | 241.321 | 21.818 | 15.00 |
| 42 | 239.043 | 23.193 | 15.00 |
| 43 | 235.552 | 24.929 | 15.00 |
| 44 | 232.007 | 26.260 | 15.00 |
| 45 | 229.635 | 26.921 | 15.00 |
| 46 | 226.095 | 27.576 | 15.00 |
| 47 | 222.616 | 27.854 | 15.00 |
| 48 | 220.351 | 27.848 | 15.00 |
| 49 | 217.058 | 27.583 | 15.00 |
| 50 | 213.910 | 27.053 | 15.00 |
| 51 | 211.899 | 26.576 | 15.00 |
| 52 | 209.019 | 25.706 | 15.00 |
| 53 | 207.191 | 25.040 | 15.00 |
| 54 | 204.591 | 23.939 | 15.00 |
| 55 | 202.158 | 22.742 | 15.00 |
| 56 | 200.626 | 21.902 | 15.00 |
| 57 | 198.462 | 20.599 | 15.00 |
| 58 | 196.453 | 19.257 | 15.00 |
| 59 | 195.198 | 18.350 | 15.00 |
| 60 | 193.439 | 16.980 | 15.00 |
| 61 | 191.823 | 15.610 | 15.00 |
| 62 | 190.823 | 14.703 | 15.00 |
| 63 | 189.434 | 13.359 | 15.00 |
| 64 | 188.175 | 12.043 | 15.00 |
| 65 | 187.405 | 11.185 | 15.00 |
| 66 | 186.352 | 9.934 | 15.00 |
| 67 | 185.415 | 8.732 | 15.00 |
| 68 | 184.853 | 7.961 | 15.00 |
| 69 | 184.105 | 6.850 | 15.00 |
| 70 | 183.459 | 5.805 | 15.00 |
| 71 | 183.077 | 5.149 | 15.00 |
| 72 | 182.570 | 4.233 | 15.00 |
| 73 | 182.159 | 3.397 | 15.00 |
| 74 | 181.947 | 2.883 | 15.00 |
| 75 | 181.719 | 2.179 | 15.00 |
| 76 | 181.622 | 1.757 | 15.00 |
| 77 | 181.589 | 1.549 | 15.00 |
| 78 | 181.570 | 1.334 | 15.00 |
| 79 | 181.565 | 1.115 | 15.00 |
| 80 | 181.575 | 0.893 | 15.00 |
| 81 | 181.603 | 0.670 | 15.00 |
| 82 | 181.648 | 0.447 | 15.00 |
| 83 | 181.712 | 0.227 | 15.00 |
| 84 | 181.796 | 0.011 | 15.00 |
| 85 | 181.898 | −0.198 | 15.00 |
| 86 | 182.018 | −0.398 | 15.00 |
| 87 | 182.156 | −0.587 | 15.00 |
| 88 | 182.311 | −0.762 | 15.00 |
| 89 | 182.481 | −0.922 | 15.00 |
| 90 | 182.666 | −1.065 | 15.00 |
| 91 | 182.862 | −1.190 | 15.00 |
| 92 | 183.069 | −1.295 | 15.00 |
| 93 | 183.283 | −1.382 | 15.00 |
| 94 | 183.504 | −1.449 | 15.00 |
| 95 | 183.728 | −1.498 | 15.00 |
| 96 | 183.954 | −1.529 | 15.00 |
| 97 | 184.179 | −1.541 | 15.00 |
| 98 | 184.401 | −1.537 | 15.00 |
| 99 | 184.619 | −1.518 | 15.00 |
| 100 | 184.832 | −1.484 | 15.00 |
| 101 | 185.011 | −1.444 | 15.00 |
| 102 | 185.526 | −1.306 | 15.00 |
| 103 | 186.121 | −1.127 | 15.00 |
| 104 | 186.563 | −0.986 | 15.00 |
| 105 | 187.292 | −0.741 | 15.00 |
| 106 | 188.104 | −0.466 | 15.00 |
| 107 | 188.693 | −0.268 | 15.00 |
| 108 | 189.646 | 0.052 | 15.00 |
| 109 | 190.682 | 0.400 | 15.00 |
| 110 | 191.420 | 0.646 | 15.00 |
| 111 | 192.599 | 1.034 | 15.00 |
| 112 | 193.865 | 1.440 | 15.00 |
| 113 | 194.758 | 1.719 | 15.00 |
| 114 | 196.172 | 2.146 | 15.00 |
| 115 | 197.677 | 2.578 | 15.00 |
| 116 | 198.731 | 2.865 | 15.00 |
| 117 | 200.390 | 3.290 | 15.00 |
| 118 | 202.144 | 3.698 | 15.00 |
| 119 | 203.367 | 3.956 | 15.00 |
| 120 | 205.282 | 4.316 | 15.00 |
| 121 | 207.295 | 4.632 | 15.00 |
| 122 | 208.690 | 4.812 | 15.00 |
| 123 | 210.863 | 5.029 | 15.00 |
| 124 | 213.131 | 5.167 | 15.00 |
| 125 | 214.695 | 5.208 | 15.00 |
| 126 | 217.115 | 5.182 | 15.00 |
| 127 | 218.775 | 5.099 | 15.00 |
| 128 | 221.332 | 4.865 | 15.00 |
| 129 | 223.960 | 4.483 | 15.00 |
| 130 | 225.747 | 4.140 | 15.00 |
| 131 | 228.471 | 3.482 | 15.00 |
| 132 | 231.236 | 2.637 | 15.00 |
| 133 | 233.094 | 1.965 | 15.00 |
| 134 | 235.895 | 0.786 | 15.00 |
| 135 | 238.698 | −0.603 | 15.00 |
| 136 | 240.560 | −1.647 | 15.00 |
| 137 | 243.330 | −3.391 | 15.00 |
| 138 | 246.065 | −5.347 | 15.00 |
| 139 | 247.847 | −6.753 | 15.00 |
| 140 | 250.371 | −8.932 | 15.00 |
| 141 | 252.723 | −11.169 | 15.00 |
| 142 | 254.200 | −12.682 | 15.00 |
| 143 | 256.289 | −14.969 | 15.00 |
| 144 | 258.237 | −17.263 | 15.00 |
| 145 | 259.463 | −18.789 | 15.00 |
| 146 | 261.201 | −21.064 | 15.00 |
| 147 | 262.828 | −23.312 | 15.00 |
| 148 | 263.855 | −24.790 | 15.00 |
| 149 | 265.318 | −26.971 | 15.00 |
| 150 | 266.696 | −29.103 | 15.00 |
| 151 | 267.570 | −30.494 | 15.00 |
| 152 | 268.823 | −32.532 | 15.00 |
| 153 | 269.620 | −33.855 | 15.00 |
| 154 | 270.765 | −35.784 | 15.00 |
| 155 | 271.853 | −37.644 | 15.00 |
| 156 | 272.548 | −38.845 | 15.00 |
| 157 | 273.550 | −40.585 | 15.00 |
| 158 | 274.503 | −42.251 | 15.00 |
| 159 | 275.112 | −43.319 | 15.00 |
| 160 | 275.990 | −44.859 | 15.00 |
| 161 | 276.824 | −46.321 | 15.00 |
| 162 | 277.356 | −47.253 | 15.00 |
| 163 | 278.119 | −48.585 | 15.00 |
| 164 | 278.840 | −49.840 | 15.00 |
| 165 | 279.298 | −50.633 | 15.00 |
| 166 | 279.950 | −51.757 | 15.00 |
| 167 | 280.560 | −52.804 | 15.00 |
| 168 | 280.944 | −53.458 | 15.00 |
| 169 | 281.485 | −54.374 | 15.00 |
| 170 | 281.983 | −55.212 | 15.00 |
| 171 | 282.292 | −55.728 | 15.00 |
| 172 | 282.718 | −56.438 | 15.00 |
| 173 | 283.101 | −57.071 | 15.00 |
| 174 | 283.331 | −57.450 | 15.00 |
| 175 | 283.640 | −57.955 | 15.00 |
| 176 | 283.821 | −58.250 | 15.00 |
| 177 | 283.973 | −58.463 | 15.00 |
| 178 | 284.137 | −58.642 | 15.00 |
| 179 | 284.326 | −58.805 | 15.00 |
| 180 | 284.563 | −58.965 | 15.00 |
| 181 | 284.793 | −59.082 | 15.00 |
| 182 | 285.039 | −59.168 | 15.00 |
| 183 | 285.326 | −59.227 | 15.00 |
| 184 | 285.584 | −59.244 | 15.00 |
| 185 | 285.838 | −59.229 | 15.00 |
| 186 | 286.083 | −59.187 | 15.00 |
| 187 | 286.342 | −59.109 | 15.00 |

TABLE I-continued

| N | X | Y | Z |
|---|---|---|---|
| 188 | 286.554 | −59.016 | 15.00 |
| 189 | 286.754 | −58.898 | 15.00 |
| 190 | 286.969 | −58.732 | 15.00 |
| 191 | 287.148 | −58.557 | 15.00 |
| 192 | 287.308 | −58.358 | 15.00 |
| 193 | 287.444 | −58.139 | 15.00 |
| 194 | 287.564 | −57.871 | 15.00 |
| 195 | 287.636 | −57.621 | 15.00 |
| 196 | 287.675 | −57.367 | 15.00 |
| 197 | 287.684 | −57.081 | 15.00 |
| 198 | 287.661 | −56.833 | 15.00 |
| 199 | 287.612 | −56.597 | 15.00 |
| 200 | 287.539 | −56.376 | 15.00 |
| 1 | 287.308 | −54.884 | 30.00 |
| 2 | 287.055 | −54.273 | 30.00 |
| 3 | 286.760 | −53.561 | 30.00 |
| 4 | 286.540 | −53.030 | 30.00 |
| 5 | 286.175 | −52.150 | 30.00 |
| 6 | 285.767 | −51.168 | 30.00 |
| 7 | 285.472 | −50.457 | 30.00 |
| 8 | 284.993 | −49.307 | 30.00 |
| 9 | 284.472 | −48.056 | 30.00 |
| 10 | 284.100 | −47.166 | 30.00 |
| 11 | 283.506 | −45.747 | 30.00 |
| 12 | 282.868 | −44.227 | 30.00 |
| 13 | 282.419 | −43.158 | 30.00 |
| 14 | 281.707 | −41.471 | 30.00 |
| 15 | 280.951 | −39.685 | 30.00 |
| 16 | 280.421 | −38.438 | 30.00 |
| 17 | 279.589 | −36.485 | 30.00 |
| 18 | 278.708 | −34.433 | 30.00 |
| 19 | 278.094 | −33.010 | 30.00 |
| 20 | 277.130 | −30.795 | 30.00 |
| 21 | 276.112 | −28.484 | 30.00 |
| 22 | 275.402 | −26.890 | 30.00 |
| 23 | 274.287 | −24.422 | 30.00 |
| 24 | 273.108 | −21.862 | 30.00 |
| 25 | 272.285 | −20.107 | 30.00 |
| 26 | 270.988 | −17.401 | 30.00 |
| 27 | 270.080 | −15.551 | 30.00 |
| 28 | 268.647 | −12.709 | 30.00 |
| 29 | 267.123 | −9.791 | 30.00 |
| 30 | 266.050 | −7.806 | 30.00 |
| 31 | 264.350 | −4.775 | 30.00 |
| 32 | 262.528 | −1.687 | 30.00 |
| 33 | 261.239 | 0.398 | 30.00 |
| 34 | 259.181 | 3.555 | 30.00 |
| 35 | 256.957 | 6.732 | 30.00 |
| 36 | 255.371 | 8.851 | 30.00 |
| 37 | 252.819 | 12.011 | 30.00 |
| 38 | 250.032 | 15.114 | 30.00 |
| 39 | 248.048 | 17.107 | 30.00 |
| 40 | 244.970 | 19.861 | 30.00 |
| 41 | 241.775 | 22.304 | 30.00 |
| 42 | 239.582 | 23.740 | 30.00 |
| 43 | 236.214 | 25.584 | 30.00 |
| 44 | 232.776 | 27.030 | 30.00 |
| 45 | 230.466 | 27.767 | 30.00 |
| 46 | 227.003 | 28.530 | 30.00 |
| 47 | 223.586 | 28.902 | 30.00 |
| 48 | 221.355 | 28.948 | 30.00 |
| 49 | 218.106 | 28.747 | 30.00 |
| 50 | 214.998 | 28.266 | 30.00 |
| 51 | 213.012 | 27.815 | 30.00 |
| 52 | 210.169 | 26.979 | 30.00 |
| 53 | 208.367 | 26.334 | 30.00 |
| 54 | 205.801 | 25.264 | 30.00 |
| 55 | 203.397 | 24.099 | 30.00 |
| 56 | 201.881 | 23.283 | 30.00 |
| 57 | 199.737 | 22.018 | 30.00 |
| 58 | 197.741 | 20.721 | 30.00 |
| 59 | 196.492 | 19.846 | 30.00 |
| 60 | 194.735 | 18.527 | 30.00 |
| 61 | 193.116 | 17.211 | 30.00 |
| 62 | 192.112 | 16.339 | 30.00 |
| 63 | 190.714 | 15.046 | 30.00 |
| 64 | 189.447 | 13.776 | 30.00 |
| 65 | 188.673 | 12.945 | 30.00 |
| 66 | 187.619 | 11.727 | 30.00 |
| 67 | 186.688 | 10.550 | 30.00 |
| 68 | 186.134 | 9.790 | 30.00 |
| 69 | 185.400 | 8.695 | 30.00 |
| 70 | 184.775 | 7.659 | 30.00 |
| 71 | 184.415 | 7.006 | 30.00 |
| 72 | 183.952 | 6.087 | 30.00 |
| 73 | 183.586 | 5.247 | 30.00 |
| 74 | 183.395 | 4.732 | 30.00 |
| 75 | 183.184 | 4.032 | 30.00 |
| 76 | 183.087 | 3.615 | 30.00 |
| 77 | 183.051 | 3.410 | 30.00 |
| 78 | 183.029 | 3.199 | 30.00 |
| 79 | 183.020 | 2.983 | 30.00 |
| 80 | 183.027 | 2.763 | 30.00 |
| 81 | 183.051 | 2.541 | 30.00 |
| 82 | 183.092 | 2.320 | 30.00 |
| 83 | 183.153 | 2.100 | 30.00 |
| 84 | 183.232 | 1.885 | 30.00 |
| 85 | 183.330 | 1.676 | 30.00 |
| 86 | 183.445 | 1.475 | 30.00 |
| 87 | 183.579 | 1.286 | 30.00 |
| 88 | 183.730 | 1.110 | 30.00 |
| 89 | 183.897 | 0.950 | 30.00 |
| 90 | 184.078 | 0.806 | 30.00 |
| 91 | 184.271 | 0.679 | 30.00 |
| 92 | 184.475 | 0.571 | 30.00 |
| 93 | 184.687 | 0.481 | 30.00 |
| 94 | 184.905 | 0.409 | 30.00 |
| 95 | 185.126 | 0.356 | 30.00 |
| 96 | 185.349 | 0.321 | 30.00 |
| 97 | 185.571 | 0.304 | 30.00 |
| 98 | 185.790 | 0.304 | 30.00 |
| 99 | 186.006 | 0.319 | 30.00 |
| 100 | 186.216 | 0.349 | 30.00 |
| 101 | 186.394 | 0.385 | 30.00 |
| 102 | 186.904 | 0.512 | 30.00 |
| 103 | 187.494 | 0.679 | 30.00 |
| 104 | 187.932 | 0.814 | 30.00 |
| 105 | 188.654 | 1.050 | 30.00 |
| 106 | 189.457 | 1.318 | 30.00 |
| 107 | 190.038 | 1.513 | 30.00 |
| 108 | 190.979 | 1.830 | 30.00 |
| 109 | 192.002 | 2.174 | 30.00 |
| 110 | 192.730 | 2.419 | 30.00 |
| 111 | 193.892 | 2.805 | 30.00 |
| 112 | 195.140 | 3.212 | 30.00 |
| 113 | 196.020 | 3.492 | 30.00 |
| 114 | 197.414 | 3.920 | 30.00 |
| 115 | 198.899 | 4.351 | 30.00 |
| 116 | 199.940 | 4.635 | 30.00 |
| 117 | 201.579 | 5.053 | 30.00 |
| 118 | 203.312 | 5.450 | 30.00 |
| 119 | 204.520 | 5.698 | 30.00 |
| 120 | 206.413 | 6.038 | 30.00 |
| 121 | 208.402 | 6.328 | 30.00 |
| 122 | 209.782 | 6.485 | 30.00 |
| 123 | 211.931 | 6.660 | 30.00 |
| 124 | 214.172 | 6.748 | 30.00 |
| 125 | 215.716 | 6.752 | 30.00 |
| 126 | 218.103 | 6.663 | 30.00 |
| 127 | 219.739 | 6.535 | 30.00 |
| 128 | 222.255 | 6.230 | 30.00 |
| 129 | 224.838 | 5.778 | 30.00 |
| 130 | 226.591 | 5.388 | 30.00 |
| 131 | 229.261 | 4.661 | 30.00 |
| 132 | 231.966 | 3.752 | 30.00 |
| 133 | 233.783 | 3.040 | 30.00 |
| 134 | 236.518 | 1.807 | 30.00 |
| 135 | 239.253 | 0.374 | 30.00 |
| 136 | 241.070 | −0.695 | 30.00 |
| 137 | 243.773 | −2.467 | 30.00 |
| 138 | 246.442 | −4.441 | 30.00 |
| 139 | 248.181 | −5.853 | 30.00 |
| 140 | 250.647 | −8.034 | 30.00 |
| 141 | 252.946 | −10.266 | 30.00 |

TABLE I-continued

| N | X | Y | Z |
|---|---|---|---|
| 142 | 254.392 | −11.772 | 30.00 |
| 143 | 256.439 | −14.044 | 30.00 |
| 144 | 258.351 | −16.318 | 30.00 |
| 145 | 259.557 | −17.829 | 30.00 |
| 146 | 261.269 | −20.078 | 30.00 |
| 147 | 262.875 | −22.296 | 30.00 |
| 148 | 263.891 | −23.754 | 30.00 |
| 149 | 265.340 | −25.905 | 30.00 |
| 150 | 266.707 | −28.005 | 30.00 |
| 151 | 267.576 | −29.375 | 30.00 |
| 152 | 268.821 | −31.381 | 30.00 |
| 153 | 269.614 | −32.684 | 30.00 |
| 154 | 270.753 | −34.584 | 30.00 |
| 155 | 271.834 | −36.416 | 30.00 |
| 156 | 272.525 | −37.599 | 30.00 |
| 157 | 273.519 | −39.313 | 30.00 |
| 158 | 274.464 | −40.955 | 30.00 |
| 159 | 275.069 | −42.009 | 30.00 |
| 160 | 275.938 | −43.526 | 30.00 |
| 161 | 276.764 | −44.968 | 30.00 |
| 162 | 277.291 | −45.887 | 30.00 |
| 163 | 278.046 | −47.202 | 30.00 |
| 164 | 278.760 | −48.440 | 30.00 |
| 165 | 279.214 | −49.222 | 30.00 |
| 166 | 279.859 | −50.331 | 30.00 |
| 167 | 280.464 | −51.362 | 30.00 |
| 168 | 280.844 | −52.007 | 30.00 |
| 169 | 281.379 | −52.911 | 30.00 |
| 170 | 281.873 | −53.738 | 30.00 |
| 171 | 282.178 | −54.247 | 30.00 |
| 172 | 282.601 | −54.946 | 30.00 |
| 173 | 282.980 | −55.570 | 30.00 |
| 174 | 283.208 | −55.944 | 30.00 |
| 175 | 283.514 | −56.442 | 30.00 |
| 176 | 283.693 | −56.733 | 30.00 |
| 177 | 283.843 | −56.941 | 30.00 |
| 178 | 284.004 | −57.115 | 30.00 |
| 179 | 284.189 | −57.274 | 30.00 |
| 180 | 284.421 | −57.429 | 30.00 |
| 181 | 284.646 | −57.542 | 30.00 |
| 182 | 284.886 | −57.626 | 30.00 |
| 183 | 285.167 | −57.682 | 30.00 |
| 184 | 285.419 | −57.697 | 30.00 |
| 185 | 285.667 | −57.682 | 30.00 |
| 186 | 285.907 | −57.639 | 30.00 |
| 187 | 286.160 | −57.562 | 30.00 |
| 188 | 286.366 | −57.470 | 30.00 |
| 189 | 286.560 | −57.353 | 30.00 |
| 190 | 286.770 | −57.189 | 30.00 |
| 191 | 286.943 | −57.017 | 30.00 |
| 192 | 287.098 | −56.822 | 30.00 |
| 193 | 287.230 | −56.607 | 30.00 |
| 194 | 287.344 | −56.344 | 30.00 |
| 195 | 287.413 | −56.100 | 30.00 |
| 196 | 287.450 | −55.851 | 30.00 |
| 197 | 287.455 | −55.572 | 30.00 |
| 198 | 287.431 | −55.330 | 30.00 |
| 199 | 287.381 | −55.099 | 30.00 |
| 200 | 287.308 | −54.884 | 30.00 |
| 1 | 287.023 | −53.396 | 45.00 |
| 2 | 286.771 | −52.798 | 45.00 |
| 3 | 286.477 | −52.100 | 45.00 |
| 4 | 286.258 | −51.580 | 45.00 |
| 5 | 285.893 | −50.718 | 45.00 |
| 6 | 285.487 | −49.756 | 45.00 |
| 7 | 285.192 | −49.060 | 45.00 |
| 8 | 284.714 | −47.934 | 45.00 |
| 9 | 284.194 | −46.708 | 45.00 |
| 10 | 283.824 | −45.836 | 45.00 |
| 11 | 283.232 | −44.446 | 45.00 |
| 12 | 282.598 | −42.957 | 45.00 |
| 13 | 282.151 | −41.910 | 45.00 |
| 14 | 281.444 | −40.257 | 45.00 |
| 15 | 280.693 | −38.505 | 45.00 |
| 16 | 280.167 | −37.283 | 45.00 |
| 17 | 279.340 | −35.369 | 45.00 |
| 18 | 278.465 | −33.358 | 45.00 |
| 19 | 277.855 | −31.964 | 45.00 |
| 20 | 276.896 | −29.794 | 45.00 |
| 21 | 275.884 | −27.529 | 45.00 |
| 22 | 275.177 | −25.968 | 45.00 |
| 23 | 274.068 | −23.551 | 45.00 |
| 24 | 272.894 | −21.045 | 45.00 |
| 25 | 272.074 | −19.326 | 45.00 |
| 26 | 270.783 | −16.677 | 45.00 |
| 27 | 269.880 | −14.866 | 45.00 |
| 28 | 268.455 | −12.084 | 45.00 |
| 29 | 266.940 | −9.227 | 45.00 |
| 30 | 265.876 | −7.283 | 45.00 |
| 31 | 264.191 | −4.314 | 45.00 |
| 32 | 262.390 | −1.289 | 45.00 |
| 33 | 261.117 | 0.755 | 45.00 |
| 34 | 259.091 | 3.852 | 45.00 |
| 35 | 256.907 | 6.972 | 45.00 |
| 36 | 255.354 | 9.057 | 45.00 |
| 37 | 252.864 | 12.174 | 45.00 |
| 38 | 250.159 | 15.249 | 45.00 |
| 39 | 248.240 | 17.236 | 45.00 |
| 40 | 245.271 | 20.001 | 45.00 |
| 41 | 242.195 | 22.480 | 45.00 |
| 42 | 240.085 | 23.957 | 45.00 |
| 43 | 236.840 | 25.879 | 45.00 |
| 44 | 233.517 | 27.423 | 45.00 |
| 45 | 231.276 | 28.232 | 45.00 |
| 46 | 227.906 | 29.108 | 45.00 |
| 47 | 224.566 | 29.593 | 45.00 |
| 48 | 222.379 | 29.712 | 45.00 |
| 49 | 219.185 | 29.613 | 45.00 |
| 50 | 216.122 | 29.221 | 45.00 |
| 51 | 214.162 | 28.824 | 45.00 |
| 52 | 211.355 | 28.062 | 45.00 |
| 53 | 209.575 | 27.461 | 45.00 |
| 54 | 207.040 | 26.451 | 45.00 |
| 55 | 204.663 | 25.339 | 45.00 |
| 56 | 203.165 | 24.557 | 45.00 |
| 57 | 201.043 | 23.341 | 45.00 |
| 58 | 199.067 | 22.093 | 45.00 |
| 59 | 197.828 | 21.250 | 45.00 |
| 60 | 196.084 | 19.980 | 45.00 |
| 61 | 194.474 | 18.712 | 45.00 |
| 62 | 193.474 | 17.871 | 45.00 |
| 63 | 192.082 | 16.622 | 45.00 |
| 64 | 190.818 | 15.393 | 45.00 |
| 65 | 190.047 | 14.588 | 45.00 |
| 66 | 188.997 | 13.405 | 45.00 |
| 67 | 188.073 | 12.257 | 45.00 |
| 68 | 187.524 | 11.514 | 45.00 |
| 69 | 186.798 | 10.442 | 45.00 |
| 70 | 186.185 | 9.426 | 45.00 |
| 71 | 185.834 | 8.783 | 45.00 |
| 72 | 185.391 | 7.878 | 45.00 |
| 73 | 185.043 | 7.048 | 45.00 |
| 74 | 184.860 | 6.539 | 45.00 |
| 75 | 184.652 | 5.849 | 45.00 |
| 76 | 184.553 | 5.441 | 45.00 |
| 77 | 184.514 | 5.239 | 45.00 |
| 78 | 184.489 | 5.031 | 45.00 |
| 79 | 184.477 | 4.817 | 45.00 |
| 80 | 184.481 | 4.600 | 45.00 |
| 81 | 184.501 | 4.381 | 45.00 |
| 82 | 184.539 | 4.161 | 45.00 |
| 83 | 184.595 | 3.942 | 45.00 |
| 84 | 184.670 | 3.727 | 45.00 |
| 85 | 184.763 | 3.518 | 45.00 |
| 86 | 184.874 | 3.318 | 45.00 |
| 87 | 185.003 | 3.128 | 45.00 |
| 88 | 185.150 | 2.952 | 45.00 |
| 89 | 185.313 | 2.791 | 45.00 |
| 90 | 185.491 | 2.646 | 45.00 |
| 91 | 185.681 | 2.517 | 45.00 |
| 92 | 185.882 | 2.407 | 45.00 |
| 93 | 186.090 | 2.314 | 45.00 |
| 94 | 186.305 | 2.238 | 45.00 |
| 95 | 186.523 | 2.181 | 45.00 |

TABLE I-continued

| N | X | Y | Z |
|---|---|---|---|
| 96 | 186.742 | 2.142 | 45.00 |
| 97 | 186.961 | 2.122 | 45.00 |
| 98 | 187.178 | 2.117 | 45.00 |
| 99 | 187.391 | 2.129 | 45.00 |
| 100 | 187.599 | 2.154 | 45.00 |
| 101 | 187.775 | 2.186 | 45.00 |
| 102 | 188.281 | 2.303 | 45.00 |
| 103 | 188.865 | 2.462 | 45.00 |
| 104 | 189.298 | 2.591 | 45.00 |
| 105 | 190.013 | 2.819 | 45.00 |
| 106 | 190.807 | 3.081 | 45.00 |
| 107 | 191.381 | 3.272 | 45.00 |
| 108 | 192.310 | 3.583 | 45.00 |
| 109 | 193.321 | 3.922 | 45.00 |
| 110 | 194.040 | 4.163 | 45.00 |
| 111 | 195.187 | 4.546 | 45.00 |
| 112 | 196.418 | 4.949 | 45.00 |
| 113 | 197.287 | 5.226 | 45.00 |
| 114 | 198.663 | 5.650 | 45.00 |
| 115 | 200.129 | 6.073 | 45.00 |
| 116 | 201.158 | 6.352 | 45.00 |
| 117 | 202.778 | 6.758 | 45.00 |
| 118 | 204.491 | 7.142 | 45.00 |
| 119 | 205.686 | 7.380 | 45.00 |
| 120 | 207.557 | 7.702 | 45.00 |
| 121 | 209.523 | 7.969 | 45.00 |
| 122 | 210.887 | 8.109 | 45.00 |
| 123 | 213.011 | 8.254 | 45.00 |
| 124 | 215.225 | 8.306 | 45.00 |
| 125 | 216.750 | 8.283 | 45.00 |
| 126 | 219.104 | 8.149 | 45.00 |
| 127 | 220.717 | 7.988 | 45.00 |
| 128 | 223.194 | 7.630 | 45.00 |
| 129 | 225.732 | 7.123 | 45.00 |
| 130 | 227.454 | 6.696 | 45.00 |
| 131 | 230.072 | 5.915 | 45.00 |
| 132 | 232.721 | 4.953 | 45.00 |
| 133 | 234.498 | 4.207 | 45.00 |
| 134 | 237.169 | 2.927 | 45.00 |
| 135 | 239.837 | 1.453 | 45.00 |
| 136 | 241.608 | 0.361 | 45.00 |
| 137 | 244.241 | −1.441 | 45.00 |
| 138 | 246.840 | −3.438 | 45.00 |
| 139 | 248.534 | −4.861 | 45.00 |
| 140 | 250.935 | −7.051 | 45.00 |
| 141 | 253.175 | −9.286 | 45.00 |
| 142 | 254.584 | −10.790 | 45.00 |
| 143 | 256.581 | −13.055 | 45.00 |
| 144 | 258.449 | −15.317 | 45.00 |
| 145 | 259.628 | −16.817 | 45.00 |
| 146 | 261.305 | −19.047 | 45.00 |
| 147 | 262.881 | −21.244 | 45.00 |
| 148 | 263.880 | −22.686 | 45.00 |
| 149 | 265.307 | −24.812 | 45.00 |
| 150 | 266.655 | −26.887 | 45.00 |
| 151 | 267.513 | −28.240 | 45.00 |
| 152 | 268.743 | −30.219 | 45.00 |
| 153 | 269.527 | −31.505 | 45.00 |
| 154 | 270.654 | −33.379 | 45.00 |
| 155 | 271.724 | −35.187 | 45.00 |
| 156 | 272.408 | −36.354 | 45.00 |
| 157 | 273.392 | −38.046 | 45.00 |
| 158 | 274.328 | −39.666 | 45.00 |
| 159 | 274.926 | −40.705 | 45.00 |
| 160 | 275.786 | −42.203 | 45.00 |
| 161 | 276.602 | −43.626 | 45.00 |
| 162 | 277.124 | −44.533 | 45.00 |
| 163 | 277.870 | −45.831 | 45.00 |
| 164 | 278.576 | −47.052 | 45.00 |
| 165 | 279.024 | −47.824 | 45.00 |
| 166 | 279.663 | −48.918 | 45.00 |
| 167 | 280.260 | −49.937 | 45.00 |
| 168 | 280.636 | −50.574 | 45.00 |
| 169 | 281.165 | −51.465 | 45.00 |
| 170 | 281.652 | −52.282 | 45.00 |
| 171 | 281.954 | −52.784 | 45.00 |
| 172 | 282.372 | −53.474 | 45.00 |
| 173 | 282.746 | −54.090 | 45.00 |
| 174 | 282.972 | −54.459 | 45.00 |
| 175 | 283.274 | −54.951 | 45.00 |
| 176 | 283.451 | −55.238 | 45.00 |
| 177 | 283.600 | −55.444 | 45.00 |
| 178 | 283.759 | −55.616 | 45.00 |
| 179 | 283.943 | −55.774 | 45.00 |
| 180 | 284.173 | −55.928 | 45.00 |
| 181 | 284.397 | −56.039 | 45.00 |
| 182 | 284.635 | −56.122 | 45.00 |
| 183 | 284.914 | −56.177 | 45.00 |
| 184 | 285.164 | −56.192 | 45.00 |
| 185 | 285.410 | −56.176 | 45.00 |
| 186 | 285.647 | −56.133 | 45.00 |
| 187 | 285.898 | −56.055 | 45.00 |
| 188 | 286.102 | −55.963 | 45.00 |
| 189 | 286.294 | −55.847 | 45.00 |
| 190 | 286.501 | −55.684 | 45.00 |
| 191 | 286.672 | −55.513 | 45.00 |
| 192 | 286.825 | −55.319 | 45.00 |
| 193 | 286.955 | −55.104 | 45.00 |
| 194 | 287.068 | −54.843 | 45.00 |
| 195 | 287.135 | −54.601 | 45.00 |
| 196 | 287.170 | −54.354 | 45.00 |
| 197 | 287.174 | −54.077 | 45.00 |
| 198 | 287.149 | −53.837 | 45.00 |
| 199 | 287.098 | −53.609 | 45.00 |
| 200 | 287.023 | −53.396 | 45.00 |
| 1 | 286.683 | −51.920 | 60.00 |
| 2 | 286.434 | −51.335 | 60.00 |
| 3 | 286.143 | −50.652 | 60.00 |
| 4 | 285.925 | −50.144 | 60.00 |
| 5 | 285.564 | −49.300 | 60.00 |
| 6 | 285.161 | −48.360 | 60.00 |
| 7 | 284.869 | −47.679 | 60.00 |
| 8 | 284.395 | −46.577 | 60.00 |
| 9 | 283.879 | −45.379 | 60.00 |
| 10 | 283.511 | −44.527 | 60.00 |
| 11 | 282.924 | −43.167 | 60.00 |
| 12 | 282.295 | −41.711 | 60.00 |
| 13 | 281.852 | −40.687 | 60.00 |
| 14 | 281.151 | −39.070 | 60.00 |
| 15 | 280.405 | −37.358 | 60.00 |
| 16 | 279.883 | −36.163 | 60.00 |
| 17 | 279.062 | −34.292 | 60.00 |
| 18 | 278.193 | −32.326 | 60.00 |
| 19 | 277.587 | −30.964 | 60.00 |
| 20 | 276.634 | −28.842 | 60.00 |
| 21 | 275.629 | −26.630 | 60.00 |
| 22 | 274.927 | −25.104 | 60.00 |
| 23 | 273.826 | −22.742 | 60.00 |
| 24 | 272.662 | −20.292 | 60.00 |
| 25 | 271.850 | −18.611 | 60.00 |
| 26 | 270.572 | −16.021 | 60.00 |
| 27 | 269.678 | −14.250 | 60.00 |
| 28 | 268.271 | −11.528 | 60.00 |
| 29 | 266.776 | −8.733 | 60.00 |
| 30 | 265.727 | −6.831 | 60.00 |
| 31 | 264.068 | −3.925 | 60.00 |
| 32 | 262.296 | −0.964 | 60.00 |
| 33 | 261.046 | 1.037 | 60.00 |
| 34 | 259.059 | 4.071 | 60.00 |
| 35 | 256.923 | 7.130 | 60.00 |
| 36 | 255.408 | 9.177 | 60.00 |
| 37 | 252.982 | 12.244 | 60.00 |
| 38 | 250.354 | 15.280 | 60.00 |
| 39 | 248.494 | 17.249 | 60.00 |
| 40 | 245.620 | 19.997 | 60.00 |
| 41 | 242.646 | 22.473 | 60.00 |
| 42 | 240.607 | 23.959 | 60.00 |
| 43 | 237.470 | 25.916 | 60.00 |
| 44 | 234.258 | 27.521 | 60.00 |
| 45 | 232.089 | 28.385 | 60.00 |
| 46 | 228.819 | 29.362 | 60.00 |
| 47 | 225.567 | 29.966 | 60.00 |
| 48 | 223.430 | 30.169 | 60.00 |
| 49 | 220.299 | 30.198 | 60.00 |

TABLE I-continued

| N | X | Y | Z |
|---|---|---|---|
| 50 | 217.285 | 29.930 | 60.00 |
| 51 | 215.352 | 29.610 | 60.00 |
| 52 | 212.577 | 28.953 | 60.00 |
| 53 | 210.816 | 28.415 | 60.00 |
| 54 | 208.306 | 27.489 | 60.00 |
| 55 | 205.953 | 26.450 | 60.00 |
| 56 | 204.471 | 25.712 | 60.00 |
| 57 | 202.373 | 24.555 | 60.00 |
| 58 | 200.421 | 23.358 | 60.00 |
| 59 | 199.198 | 22.547 | 60.00 |
| 60 | 197.476 | 21.319 | 60.00 |
| 61 | 195.888 | 20.090 | 60.00 |
| 62 | 194.902 | 19.273 | 60.00 |
| 63 | 193.528 | 18.059 | 60.00 |
| 64 | 192.279 | 16.865 | 60.00 |
| 65 | 191.517 | 16.082 | 60.00 |
| 66 | 190.478 | 14.932 | 60.00 |
| 67 | 189.559 | 13.818 | 60.00 |
| 68 | 189.012 | 13.097 | 60.00 |
| 69 | 188.287 | 12.055 | 60.00 |
| 70 | 187.672 | 11.067 | 60.00 |
| 71 | 187.318 | 10.443 | 60.00 |
| 72 | 186.865 | 9.564 | 60.00 |
| 73 | 186.503 | 8.759 | 60.00 |
| 74 | 186.312 | 8.266 | 60.00 |
| 75 | 186.095 | 7.595 | 60.00 |
| 76 | 185.990 | 7.196 | 60.00 |
| 77 | 185.950 | 6.997 | 60.00 |
| 78 | 185.921 | 6.791 | 60.00 |
| 79 | 185.906 | 6.580 | 60.00 |
| 80 | 185.907 | 6.365 | 60.00 |
| 81 | 185.923 | 6.147 | 60.00 |
| 82 | 185.958 | 5.928 | 60.00 |
| 83 | 186.010 | 5.711 | 60.00 |
| 84 | 186.081 | 5.496 | 60.00 |
| 85 | 186.171 | 5.288 | 60.00 |
| 86 | 186.278 | 5.088 | 60.00 |
| 87 | 186.403 | 4.898 | 60.00 |
| 88 | 186.546 | 4.721 | 60.00 |
| 89 | 186.705 | 4.558 | 60.00 |
| 90 | 186.879 | 4.411 | 60.00 |
| 91 | 187.066 | 4.281 | 60.00 |
| 92 | 187.263 | 4.168 | 60.00 |
| 93 | 187.468 | 4.072 | 60.00 |
| 94 | 187.679 | 3.994 | 60.00 |
| 95 | 187.895 | 3.934 | 60.00 |
| 96 | 188.111 | 3.892 | 60.00 |
| 97 | 188.328 | 3.868 | 60.00 |
| 98 | 188.543 | 3.860 | 60.00 |
| 99 | 188.754 | 3.867 | 60.00 |
| 100 | 188.960 | 3.889 | 60.00 |
| 101 | 189.135 | 3.918 | 60.00 |
| 102 | 189.636 | 4.027 | 60.00 |
| 103 | 190.215 | 4.179 | 60.00 |
| 104 | 190.643 | 4.304 | 60.00 |
| 105 | 191.349 | 4.527 | 60.00 |
| 106 | 192.135 | 4.783 | 60.00 |
| 107 | 192.703 | 4.968 | 60.00 |
| 108 | 193.622 | 5.269 | 60.00 |
| 109 | 194.622 | 5.600 | 60.00 |
| 110 | 195.333 | 5.836 | 60.00 |
| 111 | 196.468 | 6.208 | 60.00 |
| 112 | 197.686 | 6.599 | 60.00 |
| 113 | 198.546 | 6.867 | 60.00 |
| 114 | 199.908 | 7.274 | 60.00 |
| 115 | 201.359 | 7.681 | 60.00 |
| 116 | 202.377 | 7.948 | 60.00 |
| 117 | 203.980 | 8.336 | 60.00 |
| 118 | 205.675 | 8.701 | 60.00 |
| 119 | 206.857 | 8.926 | 60.00 |
| 120 | 208.709 | 9.227 | 60.00 |
| 121 | 210.654 | 9.475 | 60.00 |
| 122 | 212.002 | 9.603 | 60.00 |
| 123 | 214.100 | 9.729 | 60.00 |
| 124 | 216.288 | 9.762 | 60.00 |
| 125 | 217.793 | 9.726 | 60.00 |
| 126 | 220.117 | 9.571 | 60.00 |
| 127 | 221.708 | 9.396 | 60.00 |
| 128 | 224.149 | 9.014 | 60.00 |
| 129 | 226.650 | 8.479 | 60.00 |
| 130 | 228.344 | 8.032 | 60.00 |
| 131 | 230.917 | 7.219 | 60.00 |
| 132 | 233.517 | 6.225 | 60.00 |
| 133 | 235.258 | 5.457 | 60.00 |
| 134 | 237.873 | 4.147 | 60.00 |
| 135 | 240.481 | 2.642 | 60.00 |
| 136 | 242.208 | 1.531 | 60.00 |
| 137 | 244.775 | −0.296 | 60.00 |
| 138 | 247.305 | −2.314 | 60.00 |
| 139 | 248.953 | −3.749 | 60.00 |
| 140 | 251.288 | −5.953 | 60.00 |
| 141 | 253.466 | −8.195 | 60.00 |
| 142 | 254.836 | −9.701 | 60.00 |
| 143 | 256.778 | −11.964 | 60.00 |
| 144 | 258.595 | −14.220 | 60.00 |
| 145 | 259.743 | −15.714 | 60.00 |
| 146 | 261.377 | −17.932 | 60.00 |
| 147 | 262.914 | −20.115 | 60.00 |
| 148 | 263.890 | −21.547 | 60.00 |
| 149 | 265.285 | −23.656 | 60.00 |
| 150 | 266.604 | −25.713 | 60.00 |
| 151 | 267.444 | −27.053 | 60.00 |
| 152 | 268.651 | −29.014 | 60.00 |
| 153 | 269.421 | −30.286 | 60.00 |
| 154 | 270.528 | −32.141 | 60.00 |
| 155 | 271.581 | −33.930 | 60.00 |
| 156 | 272.255 | −35.083 | 60.00 |
| 157 | 273.224 | −36.756 | 60.00 |
| 158 | 274.147 | −38.357 | 60.00 |
| 159 | 274.737 | −39.384 | 60.00 |
| 160 | 275.586 | −40.864 | 60.00 |
| 161 | 276.392 | −42.270 | 60.00 |
| 162 | 276.906 | −43.166 | 60.00 |
| 163 | 277.643 | −44.448 | 60.00 |
| 164 | 278.340 | −45.654 | 60.00 |
| 165 | 278.782 | −46.417 | 60.00 |
| 166 | 279.411 | −47.499 | 60.00 |
| 167 | 280.000 | −48.505 | 60.00 |
| 168 | 280.370 | −49.134 | 60.00 |
| 169 | 280.892 | −50.016 | 60.00 |
| 170 | 281.372 | −50.823 | 60.00 |
| 171 | 281.669 | −51.319 | 60.00 |
| 172 | 282.080 | −52.002 | 60.00 |
| 173 | 282.449 | −52.611 | 60.00 |
| 174 | 282.671 | −52.977 | 60.00 |
| 175 | 282.968 | −53.463 | 60.00 |
| 176 | 283.142 | −53.747 | 60.00 |
| 177 | 283.288 | −53.952 | 60.00 |
| 178 | 283.447 | −54.123 | 60.00 |
| 179 | 283.628 | −54.280 | 60.00 |
| 180 | 283.857 | −54.434 | 60.00 |
| 181 | 284.079 | −54.545 | 60.00 |
| 182 | 284.315 | −54.627 | 60.00 |
| 183 | 284.592 | −54.683 | 60.00 |
| 184 | 284.841 | −54.697 | 60.00 |
| 185 | 285.085 | −54.682 | 60.00 |
| 186 | 285.321 | −54.639 | 60.00 |
| 187 | 285.569 | −54.562 | 60.00 |
| 188 | 285.772 | −54.471 | 60.00 |
| 189 | 285.963 | −54.355 | 60.00 |
| 190 | 286.169 | −54.193 | 60.00 |
| 191 | 286.338 | −54.023 | 60.00 |
| 192 | 286.490 | −53.830 | 60.00 |
| 193 | 286.619 | −53.617 | 60.00 |
| 194 | 286.730 | −53.357 | 60.00 |
| 195 | 286.796 | −53.116 | 60.00 |
| 196 | 286.831 | −52.871 | 60.00 |
| 197 | 286.834 | −52.596 | 60.00 |
| 198 | 286.808 | −52.358 | 60.00 |
| 199 | 286.757 | −52.131 | 60.00 |
| 200 | 286.683 | −51.920 | 60.00 |
| 1 | 286.372 | −50.371 | 75.00 |
| 2 | 286.127 | −49.797 | 75.00 |
| 3 | 285.840 | −49.127 | 75.00 |

TABLE I-continued

| N | X | Y | Z |
|---|---|---|---|
| 4 | 285.626 | −48.628 | 75.00 |
| 5 | 285.271 | −47.801 | 75.00 |
| 6 | 284.875 | −46.878 | 75.00 |
| 7 | 284.588 | −46.211 | 75.00 |
| 8 | 284.122 | −45.130 | 75.00 |
| 9 | 283.614 | −43.954 | 75.00 |
| 10 | 283.253 | −43.118 | 75.00 |
| 11 | 282.675 | −41.785 | 75.00 |
| 12 | 282.054 | −40.358 | 75.00 |
| 13 | 281.616 | −39.354 | 75.00 |
| 14 | 280.923 | −37.770 | 75.00 |
| 15 | 280.185 | −36.092 | 75.00 |
| 16 | 279.668 | −34.922 | 75.00 |
| 17 | 278.854 | −33.089 | 75.00 |
| 18 | 277.993 | −31.164 | 75.00 |
| 19 | 277.391 | −29.830 | 75.00 |
| 20 | 276.446 | −27.753 | 75.00 |
| 21 | 275.449 | −25.586 | 75.00 |
| 22 | 274.754 | −24.093 | 75.00 |
| 23 | 273.663 | −21.779 | 75.00 |
| 24 | 272.511 | −19.379 | 75.00 |
| 25 | 271.707 | −17.733 | 75.00 |
| 26 | 270.444 | −15.196 | 75.00 |
| 27 | 269.561 | −13.461 | 75.00 |
| 28 | 268.172 | −10.794 | 75.00 |
| 29 | 266.697 | −8.054 | 75.00 |
| 30 | 265.663 | −6.191 | 75.00 |
| 31 | 264.029 | −3.343 | 75.00 |
| 32 | 262.286 | −0.440 | 75.00 |
| 33 | 261.059 | 1.523 | 75.00 |
| 34 | 259.111 | 4.501 | 75.00 |
| 35 | 257.022 | 7.508 | 75.00 |
| 36 | 255.543 | 9.523 | 75.00 |
| 37 | 253.183 | 12.545 | 75.00 |
| 38 | 250.630 | 15.548 | 75.00 |
| 39 | 248.826 | 17.502 | 75.00 |
| 40 | 246.041 | 20.235 | 75.00 |
| 41 | 243.159 | 22.707 | 75.00 |
| 42 | 241.184 | 24.198 | 75.00 |
| 43 | 238.145 | 26.177 | 75.00 |
| 44 | 235.030 | 27.823 | 75.00 |
| 45 | 232.924 | 28.726 | 75.00 |
| 46 | 229.744 | 29.780 | 75.00 |
| 47 | 226.572 | 30.475 | 75.00 |
| 48 | 224.482 | 30.744 | 75.00 |
| 49 | 221.411 | 30.874 | 75.00 |
| 50 | 218.445 | 30.704 | 75.00 |
| 51 | 216.539 | 30.445 | 75.00 |
| 52 | 213.799 | 29.872 | 75.00 |
| 53 | 212.058 | 29.384 | 75.00 |
| 54 | 209.575 | 28.524 | 75.00 |
| 55 | 207.249 | 27.545 | 75.00 |
| 56 | 205.784 | 26.843 | 75.00 |
| 57 | 203.709 | 25.737 | 75.00 |
| 58 | 201.779 | 24.586 | 75.00 |
| 59 | 200.570 | 23.803 | 75.00 |
| 60 | 198.868 | 22.616 | 75.00 |
| 61 | 197.298 | 21.425 | 75.00 |
| 62 | 196.323 | 20.633 | 75.00 |
| 63 | 194.963 | 19.456 | 75.00 |
| 64 | 193.727 | 18.297 | 75.00 |
| 65 | 192.970 | 17.537 | 75.00 |
| 66 | 191.936 | 16.422 | 75.00 |
| 67 | 191.019 | 15.340 | 75.00 |
| 68 | 190.472 | 14.641 | 75.00 |
| 69 | 189.745 | 13.630 | 75.00 |
| 70 | 189.125 | 12.670 | 75.00 |
| 71 | 188.765 | 12.064 | 75.00 |
| 72 | 188.300 | 11.211 | 75.00 |
| 73 | 187.925 | 10.430 | 75.00 |
| 74 | 187.727 | 9.950 | 75.00 |
| 75 | 187.500 | 9.297 | 75.00 |
| 76 | 187.391 | 8.908 | 75.00 |
| 77 | 187.348 | 8.711 | 75.00 |
| 78 | 187.317 | 8.507 | 75.00 |
| 79 | 187.299 | 8.297 | 75.00 |
| 80 | 187.297 | 8.083 | 75.00 |
| 81 | 187.310 | 7.866 | 75.00 |
| 82 | 187.341 | 7.649 | 75.00 |
| 83 | 187.391 | 7.432 | 75.00 |
| 84 | 187.458 | 7.218 | 75.00 |
| 85 | 187.544 | 7.009 | 75.00 |
| 86 | 187.648 | 6.808 | 75.00 |
| 87 | 187.769 | 6.618 | 75.00 |
| 88 | 187.908 | 6.439 | 75.00 |
| 89 | 188.064 | 6.274 | 75.00 |
| 90 | 188.234 | 6.125 | 75.00 |
| 91 | 188.417 | 5.991 | 75.00 |
| 92 | 188.611 | 5.876 | 75.00 |
| 93 | 188.814 | 5.777 | 75.00 |
| 94 | 189.022 | 5.696 | 75.00 |
| 95 | 189.235 | 5.633 | 75.00 |
| 96 | 189.450 | 5.588 | 75.00 |
| 97 | 189.665 | 5.560 | 75.00 |
| 98 | 189.878 | 5.549 | 75.00 |
| 99 | 190.089 | 5.553 | 75.00 |
| 100 | 190.294 | 5.570 | 75.00 |
| 101 | 190.468 | 5.596 | 75.00 |
| 102 | 190.964 | 5.698 | 75.00 |
| 103 | 191.536 | 5.844 | 75.00 |
| 104 | 191.958 | 5.968 | 75.00 |
| 105 | 192.656 | 6.188 | 75.00 |
| 106 | 193.432 | 6.438 | 75.00 |
| 107 | 193.995 | 6.618 | 75.00 |
| 108 | 194.904 | 6.909 | 75.00 |
| 109 | 195.893 | 7.228 | 75.00 |
| 110 | 196.597 | 7.455 | 75.00 |
| 111 | 197.721 | 7.813 | 75.00 |
| 112 | 198.928 | 8.185 | 75.00 |
| 113 | 199.780 | 8.438 | 75.00 |
| 114 | 201.130 | 8.823 | 75.00 |
| 115 | 202.567 | 9.206 | 75.00 |
| 116 | 203.575 | 9.457 | 75.00 |
| 117 | 205.161 | 9.820 | 75.00 |
| 118 | 206.840 | 10.159 | 75.00 |
| 119 | 208.010 | 10.367 | 75.00 |
| 120 | 209.841 | 10.642 | 75.00 |
| 121 | 211.764 | 10.866 | 75.00 |
| 122 | 213.097 | 10.979 | 75.00 |
| 123 | 215.169 | 11.086 | 75.00 |
| 124 | 217.328 | 11.103 | 75.00 |
| 125 | 218.814 | 11.057 | 75.00 |
| 126 | 221.108 | 10.889 | 75.00 |
| 127 | 222.677 | 10.706 | 75.00 |
| 128 | 225.084 | 10.313 | 75.00 |
| 129 | 227.548 | 9.765 | 75.00 |
| 130 | 229.216 | 9.309 | 75.00 |
| 131 | 231.748 | 8.480 | 75.00 |
| 132 | 234.302 | 7.469 | 75.00 |
| 133 | 236.011 | 6.689 | 75.00 |
| 134 | 238.575 | 5.360 | 75.00 |
| 135 | 241.128 | 3.839 | 75.00 |
| 136 | 242.818 | 2.718 | 75.00 |
| 137 | 245.327 | 0.878 | 75.00 |
| 138 | 247.798 | −1.149 | 75.00 |
| 139 | 249.407 | −2.587 | 75.00 |
| 140 | 251.685 | −4.791 | 75.00 |
| 141 | 253.810 | −7.028 | 75.00 |
| 142 | 255.147 | −8.529 | 75.00 |
| 143 | 257.042 | −10.782 | 75.00 |
| 144 | 258.816 | −13.026 | 75.00 |
| 145 | 259.936 | −14.511 | 75.00 |
| 146 | 261.532 | −16.715 | 75.00 |
| 147 | 263.033 | −18.882 | 75.00 |
| 148 | 263.985 | −20.303 | 75.00 |
| 149 | 265.347 | −22.394 | 75.00 |
| 150 | 266.636 | −24.434 | 75.00 |
| 151 | 267.457 | −25.762 | 75.00 |
| 152 | 268.637 | −27.704 | 75.00 |
| 153 | 269.390 | −28.965 | 75.00 |
| 154 | 270.475 | −30.802 | 75.00 |
| 155 | 271.507 | −32.571 | 75.00 |
| 156 | 272.167 | −33.713 | 75.00 |
| 157 | 273.119 | −35.367 | 75.00 |

TABLE I-continued

| N | X | Y | Z |
|---|---|---|---|
| 158 | 274.025 | −36.951 | 75.00 |
| 159 | 274.605 | −37.966 | 75.00 |
| 160 | 275.439 | −39.429 | 75.00 |
| 161 | 276.232 | −40.819 | 75.00 |
| 162 | 276.737 | −41.705 | 75.00 |
| 163 | 277.461 | −42.972 | 75.00 |
| 164 | 278.146 | −44.165 | 75.00 |
| 165 | 278.579 | −44.920 | 75.00 |
| 166 | 279.197 | −45.990 | 75.00 |
| 167 | 279.775 | −46.985 | 75.00 |
| 168 | 280.138 | −47.608 | 75.00 |
| 169 | 280.648 | −48.481 | 75.00 |
| 170 | 281.118 | −49.280 | 75.00 |
| 171 | 281.409 | −49.772 | 75.00 |
| 172 | 281.811 | −50.448 | 75.00 |
| 173 | 282.171 | −51.052 | 75.00 |
| 174 | 282.388 | −51.414 | 75.00 |
| 175 | 282.678 | −51.896 | 75.00 |
| 176 | 282.847 | −52.177 | 75.00 |
| 177 | 282.992 | −52.383 | 75.00 |
| 178 | 283.149 | −52.555 | 75.00 |
| 179 | 283.329 | −52.712 | 75.00 |
| 180 | 283.556 | −52.867 | 75.00 |
| 181 | 283.777 | −52.979 | 75.00 |
| 182 | 284.012 | −53.062 | 75.00 |
| 183 | 284.288 | −53.119 | 75.00 |
| 184 | 284.535 | −53.134 | 75.00 |
| 185 | 284.779 | −53.120 | 75.00 |
| 186 | 285.014 | −53.078 | 75.00 |
| 187 | 285.262 | −53.002 | 75.00 |
| 188 | 285.465 | −52.912 | 75.00 |
| 189 | 285.655 | −52.797 | 75.00 |
| 190 | 285.860 | −52.636 | 75.00 |
| 191 | 286.030 | −52.466 | 75.00 |
| 192 | 286.181 | −52.274 | 75.00 |
| 193 | 286.310 | −52.062 | 75.00 |
| 194 | 286.421 | −51.803 | 75.00 |
| 195 | 286.487 | −51.563 | 75.00 |
| 196 | 286.521 | −51.318 | 75.00 |
| 197 | 286.524 | −51.044 | 75.00 |
| 198 | 286.498 | −50.806 | 75.00 |
| 199 | 286.447 | −50.580 | 75.00 |
| 200 | 286.372 | −50.371 | 75.00 |
| 1 | 286.108 | −48.758 | 90.00 |
| 2 | 285.866 | −48.193 | 90.00 |
| 3 | 285.585 | −47.534 | 90.00 |
| 4 | 285.376 | −47.042 | 90.00 |
| 5 | 285.029 | −46.226 | 90.00 |
| 6 | 284.642 | −45.317 | 90.00 |
| 7 | 284.362 | −44.658 | 90.00 |
| 8 | 283.908 | −43.592 | 90.00 |
| 9 | 283.414 | −42.433 | 90.00 |
| 10 | 283.061 | −41.608 | 90.00 |
| 11 | 282.496 | −40.295 | 90.00 |
| 12 | 281.887 | −38.888 | 90.00 |
| 13 | 281.457 | −37.900 | 90.00 |
| 14 | 280.776 | −36.340 | 90.00 |
| 15 | 280.049 | −34.689 | 90.00 |
| 16 | 279.539 | −33.537 | 90.00 |
| 17 | 278.736 | −31.734 | 90.00 |
| 18 | 277.885 | −29.840 | 90.00 |
| 19 | 277.291 | −28.527 | 90.00 |
| 20 | 276.358 | −26.484 | 90.00 |
| 21 | 275.373 | −24.353 | 90.00 |
| 22 | 274.686 | −22.883 | 90.00 |
| 23 | 273.609 | −20.607 | 90.00 |
| 24 | 272.471 | −18.246 | 90.00 |
| 25 | 271.677 | −16.627 | 90.00 |
| 26 | 270.430 | −14.131 | 90.00 |
| 27 | 269.558 | −12.425 | 90.00 |
| 28 | 268.185 | −9.802 | 90.00 |
| 29 | 266.729 | −7.109 | 90.00 |
| 30 | 265.708 | −5.276 | 90.00 |
| 31 | 264.096 | −2.476 | 90.00 |
| 32 | 262.379 | 0.382 | 90.00 |
| 33 | 261.172 | 2.315 | 90.00 |
| 34 | 259.260 | 5.251 | 90.00 |
| 35 | 257.215 | 8.219 | 90.00 |
| 36 | 255.770 | 10.210 | 90.00 |
| 37 | 253.470 | 13.203 | 90.00 |
| 38 | 250.989 | 16.184 | 90.00 |
| 39 | 249.237 | 18.128 | 90.00 |
| 40 | 246.534 | 20.860 | 90.00 |
| 41 | 243.736 | 23.343 | 90.00 |
| 42 | 241.818 | 24.845 | 90.00 |
| 43 | 238.864 | 26.846 | 90.00 |
| 44 | 235.829 | 28.525 | 90.00 |
| 45 | 233.775 | 29.456 | 90.00 |
| 46 | 230.666 | 30.558 | 90.00 |
| 47 | 227.559 | 31.308 | 90.00 |
| 48 | 225.507 | 31.616 | 90.00 |
| 49 | 222.487 | 31.804 | 90.00 |
| 50 | 219.565 | 31.687 | 90.00 |
| 51 | 217.685 | 31.461 | 90.00 |
| 52 | 214.980 | 30.934 | 90.00 |
| 53 | 213.260 | 30.475 | 90.00 |
| 54 | 210.809 | 29.655 | 90.00 |
| 55 | 208.509 | 28.715 | 90.00 |
| 56 | 207.059 | 28.039 | 90.00 |
| 57 | 205.004 | 26.971 | 90.00 |
| 58 | 203.091 | 25.859 | 90.00 |
| 59 | 201.890 | 25.103 | 90.00 |
| 60 | 200.200 | 23.957 | 90.00 |
| 61 | 198.639 | 22.805 | 90.00 |
| 62 | 197.668 | 22.040 | 90.00 |
| 63 | 196.313 | 20.901 | 90.00 |
| 64 | 195.079 | 19.778 | 90.00 |
| 65 | 194.324 | 19.041 | 90.00 |
| 66 | 193.292 | 17.957 | 90.00 |
| 67 | 192.377 | 16.902 | 90.00 |
| 68 | 191.830 | 16.220 | 90.00 |
| 69 | 191.104 | 15.231 | 90.00 |
| 70 | 190.483 | 14.293 | 90.00 |
| 71 | 190.124 | 13.700 | 90.00 |
| 72 | 189.662 | 12.864 | 90.00 |
| 73 | 189.290 | 12.096 | 90.00 |
| 74 | 189.092 | 11.625 | 90.00 |
| 75 | 188.863 | 10.984 | 90.00 |
| 76 | 188.751 | 10.602 | 90.00 |
| 77 | 188.706 | 10.406 | 90.00 |
| 78 | 188.672 | 10.204 | 90.00 |
| 79 | 188.651 | 9.995 | 90.00 |
| 80 | 188.646 | 9.782 | 90.00 |
| 81 | 188.657 | 9.566 | 90.00 |
| 82 | 188.685 | 9.349 | 90.00 |
| 83 | 188.731 | 9.132 | 90.00 |
| 84 | 188.796 | 8.918 | 90.00 |
| 85 | 188.878 | 8.709 | 90.00 |
| 86 | 188.978 | 8.507 | 90.00 |
| 87 | 189.096 | 8.315 | 90.00 |
| 88 | 189.231 | 8.134 | 90.00 |
| 89 | 189.384 | 7.966 | 90.00 |
| 90 | 189.551 | 7.814 | 90.00 |
| 91 | 189.731 | 7.677 | 90.00 |
| 92 | 189.923 | 7.558 | 90.00 |
| 93 | 190.123 | 7.457 | 90.00 |
| 94 | 190.329 | 7.373 | 90.00 |
| 95 | 190.541 | 7.307 | 90.00 |
| 96 | 190.754 | 7.259 | 90.00 |
| 97 | 190.968 | 7.227 | 90.00 |
| 98 | 191.180 | 7.212 | 90.00 |
| 99 | 191.389 | 7.212 | 90.00 |
| 100 | 191.593 | 7.226 | 90.00 |
| 101 | 191.767 | 7.249 | 90.00 |
| 102 | 192.258 | 7.342 | 90.00 |
| 103 | 192.822 | 7.484 | 90.00 |
| 104 | 193.239 | 7.605 | 90.00 |
| 105 | 193.928 | 7.824 | 90.00 |
| 106 | 194.695 | 8.069 | 90.00 |
| 107 | 195.250 | 8.244 | 90.00 |
| 108 | 196.150 | 8.526 | 90.00 |
| 109 | 197.129 | 8.833 | 90.00 |
| 110 | 197.825 | 9.051 | 90.00 |
| 111 | 198.938 | 9.393 | 90.00 |

TABLE I-continued

| N | X | Y | Z |
|---|---|---|---|
| 112 | 200.134 | 9.746 | 90.00 |
| 113 | 200.978 | 9.987 | 90.00 |
| 114 | 202.315 | 10.349 | 90.00 |
| 115 | 203.738 | 10.709 | 90.00 |
| 116 | 204.735 | 10.944 | 90.00 |
| 117 | 206.305 | 11.282 | 90.00 |
| 118 | 207.965 | 11.595 | 90.00 |
| 119 | 209.122 | 11.784 | 90.00 |
| 120 | 210.933 | 12.033 | 90.00 |
| 121 | 212.834 | 12.228 | 90.00 |
| 122 | 214.150 | 12.324 | 90.00 |
| 123 | 216.196 | 12.405 | 90.00 |
| 124 | 218.327 | 12.399 | 90.00 |
| 125 | 219.793 | 12.339 | 90.00 |
| 126 | 222.055 | 12.153 | 90.00 |
| 127 | 223.602 | 11.959 | 90.00 |
| 128 | 225.975 | 11.551 | 90.00 |
| 129 | 228.401 | 10.989 | 90.00 |
| 130 | 230.043 | 10.524 | 90.00 |
| 131 | 232.533 | 9.682 | 90.00 |
| 132 | 235.043 | 8.658 | 90.00 |
| 133 | 236.720 | 7.871 | 90.00 |
| 134 | 239.234 | 6.530 | 90.00 |
| 135 | 241.737 | 5.000 | 90.00 |
| 136 | 243.394 | 3.874 | 90.00 |
| 137 | 245.854 | 2.032 | 90.00 |
| 138 | 248.275 | 0.009 | 90.00 |
| 139 | 249.850 | −1.422 | 90.00 |
| 140 | 252.082 | −3.613 | 90.00 |
| 141 | 254.165 | −5.833 | 90.00 |
| 142 | 255.476 | −7.321 | 90.00 |
| 143 | 257.335 | −9.554 | 90.00 |
| 144 | 259.076 | −11.778 | 90.00 |
| 145 | 260.175 | −13.249 | 90.00 |
| 146 | 261.740 | −15.432 | 90.00 |
| 147 | 263.211 | −17.578 | 90.00 |
| 148 | 264.144 | −18.985 | 90.00 |
| 149 | 265.478 | −21.056 | 90.00 |
| 150 | 266.740 | −23.075 | 90.00 |
| 151 | 267.544 | −24.389 | 90.00 |
| 152 | 268.698 | −26.312 | 90.00 |
| 153 | 269.435 | −27.559 | 90.00 |
| 154 | 270.496 | −29.377 | 90.00 |
| 155 | 271.507 | −31.128 | 90.00 |
| 156 | 272.153 | −32.257 | 90.00 |
| 157 | 273.086 | −33.893 | 90.00 |
| 158 | 273.974 | −35.459 | 90.00 |
| 159 | 274.542 | −36.464 | 90.00 |
| 160 | 275.359 | −37.911 | 90.00 |
| 161 | 276.135 | −39.286 | 90.00 |
| 162 | 276.629 | −40.162 | 90.00 |
| 163 | 277.338 | −41.416 | 90.00 |
| 164 | 278.007 | −42.597 | 90.00 |
| 165 | 278.431 | −43.344 | 90.00 |
| 166 | 279.034 | −44.404 | 90.00 |
| 167 | 279.597 | −45.391 | 90.00 |
| 168 | 279.951 | −46.008 | 90.00 |
| 169 | 280.448 | −46.873 | 90.00 |
| 170 | 280.905 | −47.665 | 90.00 |
| 171 | 281.188 | −48.153 | 90.00 |
| 172 | 281.578 | −48.824 | 90.00 |
| 173 | 281.928 | −49.423 | 90.00 |
| 174 | 282.138 | −49.783 | 90.00 |
| 175 | 282.419 | −50.262 | 90.00 |
| 176 | 282.584 | −50.541 | 90.00 |
| 177 | 282.726 | −50.748 | 90.00 |
| 178 | 282.881 | −50.922 | 90.00 |
| 179 | 283.060 | −51.081 | 90.00 |
| 180 | 283.286 | −51.238 | 90.00 |
| 181 | 283.506 | −51.352 | 90.00 |
| 182 | 283.740 | −51.437 | 90.00 |
| 183 | 284.016 | −51.496 | 90.00 |
| 184 | 284.264 | −51.513 | 90.00 |
| 185 | 284.508 | −51.500 | 90.00 |
| 186 | 284.743 | −51.460 | 90.00 |
| 187 | 284.992 | −51.386 | 90.00 |
| 188 | 285.195 | −51.296 | 90.00 |
| 189 | 285.386 | −51.182 | 90.00 |
| 190 | 285.592 | −51.022 | 90.00 |
| 191 | 285.762 | −50.854 | 90.00 |
| 192 | 285.914 | −50.662 | 90.00 |
| 193 | 286.044 | −50.450 | 90.00 |
| 194 | 286.156 | −50.191 | 90.00 |
| 195 | 286.222 | −49.950 | 90.00 |
| 196 | 286.256 | −49.705 | 90.00 |
| 197 | 286.260 | −49.431 | 90.00 |
| 198 | 286.234 | −49.194 | 90.00 |
| 199 | 286.183 | −48.968 | 90.00 |
| 200 | 286.108 | −48.758 | 90.00 |
| 1 | 285.809 | −47.221 | 105.00 |
| 2 | 285.574 | −46.662 | 105.00 |
| 3 | 285.299 | −46.010 | 105.00 |
| 4 | 285.095 | −45.524 | 105.00 |
| 5 | 284.757 | −44.717 | 105.00 |
| 6 | 284.380 | −43.817 | 105.00 |
| 7 | 284.108 | −43.165 | 105.00 |
| 8 | 283.666 | −42.111 | 105.00 |
| 9 | 283.184 | −40.964 | 105.00 |
| 10 | 282.840 | −40.149 | 105.00 |
| 11 | 282.289 | −38.849 | 105.00 |
| 12 | 281.696 | −37.458 | 105.00 |
| 13 | 281.276 | −36.480 | 105.00 |
| 14 | 280.610 | −34.938 | 105.00 |
| 15 | 279.900 | −33.305 | 105.00 |
| 16 | 279.402 | −32.166 | 105.00 |
| 17 | 278.616 | −30.383 | 105.00 |
| 18 | 277.784 | −28.511 | 105.00 |
| 19 | 277.202 | −27.214 | 105.00 |
| 20 | 276.289 | −25.194 | 105.00 |
| 21 | 275.324 | −23.087 | 105.00 |
| 22 | 274.650 | −21.634 | 105.00 |
| 23 | 273.594 | −19.384 | 105.00 |
| 24 | 272.477 | −17.052 | 105.00 |
| 25 | 271.698 | −15.451 | 105.00 |
| 26 | 270.473 | −12.986 | 105.00 |
| 27 | 269.617 | −11.299 | 105.00 |
| 28 | 268.268 | −8.709 | 105.00 |
| 29 | 266.838 | −6.048 | 105.00 |
| 30 | 265.835 | −4.237 | 105.00 |
| 31 | 264.252 | −1.468 | 105.00 |
| 32 | 262.568 | 1.359 | 105.00 |
| 33 | 261.385 | 3.272 | 105.00 |
| 34 | 259.512 | 6.178 | 105.00 |
| 35 | 257.510 | 9.120 | 105.00 |
| 36 | 256.097 | 11.094 | 105.00 |
| 37 | 253.847 | 14.064 | 105.00 |
| 38 | 251.424 | 17.025 | 105.00 |
| 39 | 249.713 | 18.959 | 105.00 |
| 40 | 247.073 | 21.685 | 105.00 |
| 41 | 244.341 | 24.170 | 105.00 |
| 42 | 242.467 | 25.678 | 105.00 |
| 43 | 239.580 | 27.694 | 105.00 |
| 44 | 236.611 | 29.396 | 105.00 |
| 45 | 234.597 | 30.346 | 105.00 |
| 46 | 231.548 | 31.483 | 105.00 |
| 47 | 228.494 | 32.274 | 105.00 |
| 48 | 226.475 | 32.612 | 105.00 |
| 49 | 223.498 | 32.845 | 105.00 |
| 50 | 220.614 | 32.776 | 105.00 |
| 51 | 218.756 | 32.582 | 105.00 |
| 52 | 216.080 | 32.103 | 105.00 |
| 53 | 214.376 | 31.676 | 105.00 |
| 54 | 211.945 | 30.905 | 105.00 |
| 55 | 209.662 | 30.011 | 105.00 |
| 56 | 208.221 | 29.365 | 105.00 |
| 57 | 206.179 | 28.340 | 105.00 |
| 58 | 204.275 | 27.270 | 105.00 |
| 59 | 203.080 | 26.539 | 105.00 |
| 60 | 201.397 | 25.430 | 105.00 |
| 61 | 199.842 | 24.313 | 105.00 |
| 62 | 198.875 | 23.568 | 105.00 |
| 63 | 197.527 | 22.456 | 105.00 |
| 64 | 196.300 | 21.357 | 105.00 |
| 65 | 195.551 | 20.634 | 105.00 |

TABLE I-continued

| N | X | Y | Z |
|---|---|---|---|
| 66 | 194.529 | 19.566 | 105.00 |
| 67 | 193.627 | 18.526 | 105.00 |
| 68 | 193.090 | 17.851 | 105.00 |
| 69 | 192.377 | 16.873 | 105.00 |
| 70 | 191.769 | 15.945 | 105.00 |
| 71 | 191.419 | 15.357 | 105.00 |
| 72 | 190.969 | 14.529 | 105.00 |
| 73 | 190.608 | 13.769 | 105.00 |
| 74 | 190.413 | 13.304 | 105.00 |
| 75 | 190.185 | 12.671 | 105.00 |
| 76 | 190.071 | 12.295 | 105.00 |
| 77 | 190.023 | 12.102 | 105.00 |
| 78 | 189.986 | 11.900 | 105.00 |
| 79 | 189.963 | 11.693 | 105.00 |
| 80 | 189.955 | 11.482 | 105.00 |
| 81 | 189.963 | 11.267 | 105.00 |
| 82 | 189.989 | 11.050 | 105.00 |
| 83 | 190.032 | 10.834 | 105.00 |
| 84 | 190.093 | 10.620 | 105.00 |
| 85 | 190.171 | 10.411 | 105.00 |
| 86 | 190.268 | 10.208 | 105.00 |
| 87 | 190.382 | 10.015 | 105.00 |
| 88 | 190.514 | 9.832 | 105.00 |
| 89 | 190.663 | 9.663 | 105.00 |
| 90 | 190.827 | 9.508 | 105.00 |
| 91 | 191.005 | 9.369 | 105.00 |
| 92 | 191.193 | 9.247 | 105.00 |
| 93 | 191.391 | 9.143 | 105.00 |
| 94 | 191.596 | 9.057 | 105.00 |
| 95 | 191.805 | 8.988 | 105.00 |
| 96 | 192.016 | 8.936 | 105.00 |
| 97 | 192.228 | 8.901 | 105.00 |
| 98 | 192.439 | 8.883 | 105.00 |
| 99 | 192.647 | 8.880 | 105.00 |
| 100 | 192.850 | 8.890 | 105.00 |
| 101 | 193.023 | 8.910 | 105.00 |
| 102 | 193.509 | 8.995 | 105.00 |
| 103 | 194.067 | 9.130 | 105.00 |
| 104 | 194.480 | 9.248 | 105.00 |
| 105 | 195.161 | 9.461 | 105.00 |
| 106 | 195.919 | 9.702 | 105.00 |
| 107 | 196.468 | 9.873 | 105.00 |
| 108 | 197.358 | 10.148 | 105.00 |
| 109 | 198.326 | 10.448 | 105.00 |
| 110 | 199.014 | 10.661 | 105.00 |
| 111 | 200.115 | 10.994 | 105.00 |
| 112 | 201.297 | 11.339 | 105.00 |
| 113 | 202.132 | 11.573 | 105.00 |
| 114 | 203.454 | 11.926 | 105.00 |
| 115 | 204.861 | 12.276 | 105.00 |
| 116 | 205.847 | 12.504 | 105.00 |
| 117 | 207.399 | 12.831 | 105.00 |
| 118 | 209.040 | 13.131 | 105.00 |
| 119 | 210.184 | 13.310 | 105.00 |
| 120 | 211.975 | 13.542 | 105.00 |
| 121 | 213.853 | 13.717 | 105.00 |
| 122 | 215.154 | 13.798 | 105.00 |
| 123 | 217.176 | 13.853 | 105.00 |
| 124 | 219.280 | 13.819 | 105.00 |
| 125 | 220.727 | 13.738 | 105.00 |
| 126 | 222.958 | 13.521 | 105.00 |
| 127 | 224.482 | 13.306 | 105.00 |
| 128 | 226.819 | 12.866 | 105.00 |
| 129 | 229.207 | 12.274 | 105.00 |
| 130 | 230.821 | 11.789 | 105.00 |
| 131 | 233.267 | 10.920 | 105.00 |
| 132 | 235.730 | 9.872 | 105.00 |
| 133 | 237.374 | 9.070 | 105.00 |
| 134 | 239.838 | 7.711 | 105.00 |
| 135 | 242.290 | 6.166 | 105.00 |
| 136 | 243.912 | 5.033 | 105.00 |
| 137 | 246.321 | 3.185 | 105.00 |
| 138 | 248.690 | 1.161 | 105.00 |
| 139 | 250.231 | −0.268 | 105.00 |
| 140 | 252.415 | −2.451 | 105.00 |
| 141 | 254.454 | −4.659 | 105.00 |
| 142 | 255.739 | −6.138 | 105.00 |
| 143 | 257.561 | −8.355 | 105.00 |
| 144 | 259.268 | −10.561 | 105.00 |
| 145 | 260.346 | −12.019 | 105.00 |
| 146 | 261.880 | −14.183 | 105.00 |
| 147 | 263.324 | −16.310 | 105.00 |
| 148 | 264.239 | −17.704 | 105.00 |
| 149 | 265.548 | −19.755 | 105.00 |
| 150 | 266.786 | −21.754 | 105.00 |
| 151 | 267.575 | −23.056 | 105.00 |
| 152 | 268.708 | −24.959 | 105.00 |
| 153 | 269.431 | −26.194 | 105.00 |
| 154 | 270.472 | −27.993 | 105.00 |
| 155 | 271.464 | −29.726 | 105.00 |
| 156 | 272.098 | −30.844 | 105.00 |
| 157 | 273.012 | −32.463 | 105.00 |
| 158 | 273.882 | −34.014 | 105.00 |
| 159 | 274.439 | −35.008 | 105.00 |
| 160 | 275.239 | −36.441 | 105.00 |
| 161 | 275.998 | −37.803 | 105.00 |
| 162 | 276.482 | −38.671 | 105.00 |
| 163 | 277.174 | −39.914 | 105.00 |
| 164 | 277.827 | −41.085 | 105.00 |
| 165 | 278.241 | −41.825 | 105.00 |
| 166 | 278.829 | −42.876 | 105.00 |
| 167 | 279.377 | −43.855 | 105.00 |
| 168 | 279.722 | −44.467 | 105.00 |
| 169 | 280.205 | −45.326 | 105.00 |
| 170 | 280.650 | −46.113 | 105.00 |
| 171 | 280.924 | −46.598 | 105.00 |
| 172 | 281.303 | −47.265 | 105.00 |
| 173 | 281.642 | −47.860 | 105.00 |
| 174 | 281.846 | −48.217 | 105.00 |
| 175 | 282.118 | −48.693 | 105.00 |
| 176 | 282.277 | −48.971 | 105.00 |
| 177 | 282.417 | −49.180 | 105.00 |
| 178 | 282.570 | −49.355 | 105.00 |
| 179 | 282.747 | −49.517 | 105.00 |
| 180 | 282.971 | −49.676 | 105.00 |
| 181 | 283.190 | −49.792 | 105.00 |
| 182 | 283.424 | −49.880 | 105.00 |
| 183 | 283.699 | −49.941 | 105.00 |
| 184 | 283.946 | −49.961 | 105.00 |
| 185 | 284.191 | −49.950 | 105.00 |
| 186 | 284.427 | −49.912 | 105.00 |
| 187 | 284.676 | −49.840 | 105.00 |
| 188 | 284.879 | −49.752 | 105.00 |
| 189 | 285.071 | −49.640 | 105.00 |
| 190 | 285.279 | −49.482 | 105.00 |
| 191 | 285.450 | −49.314 | 105.00 |
| 192 | 285.604 | −49.124 | 105.00 |
| 193 | 285.735 | −48.912 | 105.00 |
| 194 | 285.849 | −48.654 | 105.00 |
| 195 | 285.916 | −48.414 | 105.00 |
| 196 | 285.952 | −48.169 | 105.00 |
| 197 | 285.958 | −47.895 | 105.00 |
| 198 | 285.933 | −47.657 | 105.00 |
| 199 | 285.883 | −47.431 | 105.00 |
| 200 | 285.809 | −47.221 | 105.00 |
| 1 | 285.463 | −45.758 | 120.00 |
| 2 | 285.236 | −45.204 | 120.00 |
| 3 | 284.970 | −44.557 | 120.00 |
| 4 | 284.772 | −44.075 | 120.00 |
| 5 | 284.442 | −43.276 | 120.00 |
| 6 | 284.075 | −42.385 | 120.00 |
| 7 | 283.808 | −41.739 | 120.00 |
| 8 | 283.376 | −40.696 | 120.00 |
| 9 | 282.905 | −39.560 | 120.00 |
| 10 | 282.569 | −38.753 | 120.00 |
| 11 | 282.031 | −37.465 | 120.00 |
| 12 | 281.454 | −36.087 | 120.00 |
| 13 | 281.046 | −35.118 | 120.00 |
| 14 | 280.399 | −33.589 | 120.00 |
| 15 | 279.710 | −31.970 | 120.00 |
| 16 | 279.227 | −30.840 | 120.00 |
| 17 | 278.465 | −29.072 | 120.00 |
| 18 | 277.657 | −27.215 | 120.00 |
| 19 | 277.093 | −25.928 | 120.00 |

TABLE I-continued

| N | X | Y | Z |
|---|---|---|---|
| 20 | 276.205 | −23.926 | 120.00 |
| 21 | 275.267 | −21.836 | 120.00 |
| 22 | 274.612 | −20.396 | 120.00 |
| 23 | 273.583 | −18.166 | 120.00 |
| 24 | 272.495 | −15.854 | 120.00 |
| 25 | 271.735 | −14.268 | 120.00 |
| 26 | 270.539 | −11.824 | 120.00 |
| 27 | 269.704 | −10.152 | 120.00 |
| 28 | 268.388 | −7.583 | 120.00 |
| 29 | 266.992 | −4.944 | 120.00 |
| 30 | 266.014 | −3.147 | 120.00 |
| 31 | 264.470 | −0.400 | 120.00 |
| 32 | 262.827 | 2.406 | 120.00 |
| 33 | 261.672 | 4.306 | 120.00 |
| 34 | 259.842 | 7.192 | 120.00 |
| 35 | 257.882 | 10.112 | 120.00 |
| 36 | 256.497 | 12.071 | 120.00 |
| 37 | 254.289 | 15.016 | 120.00 |
| 38 | 251.905 | 17.951 | 120.00 |
| 39 | 250.221 | 19.869 | 120.00 |
| 40 | 247.623 | 22.572 | 120.00 |
| 41 | 244.935 | 25.042 | 120.00 |
| 42 | 243.094 | 26.544 | 120.00 |
| 43 | 240.257 | 28.560 | 120.00 |
| 44 | 237.340 | 30.273 | 120.00 |
| 45 | 235.362 | 31.236 | 120.00 |
| 46 | 232.364 | 32.402 | 120.00 |
| 47 | 229.360 | 33.231 | 120.00 |
| 48 | 227.370 | 33.598 | 120.00 |
| 49 | 224.434 | 33.883 | 120.00 |
| 50 | 221.584 | 33.872 | 120.00 |
| 51 | 219.744 | 33.721 | 120.00 |
| 52 | 217.088 | 33.309 | 120.00 |
| 53 | 215.393 | 32.928 | 120.00 |
| 54 | 212.971 | 32.225 | 120.00 |
| 55 | 210.696 | 31.395 | 120.00 |
| 56 | 209.259 | 30.787 | 120.00 |
| 57 | 207.222 | 29.816 | 120.00 |
| 58 | 205.324 | 28.790 | 120.00 |
| 59 | 204.133 | 28.085 | 120.00 |
| 60 | 202.458 | 27.007 | 120.00 |
| 61 | 200.913 | 25.914 | 120.00 |
| 62 | 199.954 | 25.182 | 120.00 |
| 63 | 198.620 | 24.083 | 120.00 |
| 64 | 197.411 | 22.991 | 120.00 |
| 65 | 196.675 | 22.271 | 120.00 |
| 66 | 195.676 | 21.206 | 120.00 |
| 67 | 194.799 | 20.167 | 120.00 |
| 68 | 194.279 | 19.493 | 120.00 |
| 69 | 193.593 | 18.515 | 120.00 |
| 70 | 193.010 | 17.587 | 120.00 |
| 71 | 192.673 | 17.001 | 120.00 |
| 72 | 192.241 | 16.176 | 120.00 |
| 73 | 191.890 | 15.422 | 120.00 |
| 74 | 191.699 | 14.961 | 120.00 |
| 75 | 191.471 | 14.337 | 120.00 |
| 76 | 191.354 | 13.966 | 120.00 |
| 77 | 191.303 | 13.775 | 120.00 |
| 78 | 191.264 | 13.575 | 120.00 |
| 79 | 191.239 | 13.370 | 120.00 |
| 80 | 191.228 | 13.160 | 120.00 |
| 81 | 191.233 | 12.947 | 120.00 |
| 82 | 191.255 | 12.731 | 120.00 |
| 83 | 191.295 | 12.516 | 120.00 |
| 84 | 191.353 | 12.302 | 120.00 |
| 85 | 191.428 | 12.093 | 120.00 |
| 86 | 191.521 | 11.891 | 120.00 |
| 87 | 191.632 | 11.697 | 120.00 |
| 88 | 191.761 | 11.514 | 120.00 |
| 89 | 191.906 | 11.344 | 120.00 |
| 90 | 192.067 | 11.187 | 120.00 |
| 91 | 192.242 | 11.047 | 120.00 |
| 92 | 192.427 | 10.924 | 120.00 |
| 93 | 192.622 | 10.817 | 120.00 |
| 94 | 192.824 | 10.729 | 120.00 |
| 95 | 193.031 | 10.657 | 120.00 |
| 96 | 193.240 | 10.603 | 120.00 |
| 97 | 193.450 | 10.566 | 120.00 |
| 98 | 193.659 | 10.545 | 120.00 |
| 99 | 193.865 | 10.538 | 120.00 |
| 100 | 194.068 | 10.546 | 120.00 |
| 101 | 194.240 | 10.563 | 120.00 |
| 102 | 194.721 | 10.641 | 120.00 |
| 103 | 195.274 | 10.768 | 120.00 |
| 104 | 195.684 | 10.880 | 120.00 |
| 105 | 196.358 | 11.086 | 120.00 |
| 106 | 197.109 | 11.321 | 120.00 |
| 107 | 197.652 | 11.489 | 120.00 |
| 108 | 198.532 | 11.760 | 120.00 |
| 109 | 199.488 | 12.058 | 120.00 |
| 110 | 200.168 | 12.271 | 120.00 |
| 111 | 201.255 | 12.604 | 120.00 |
| 112 | 202.423 | 12.951 | 120.00 |
| 113 | 203.247 | 13.187 | 120.00 |
| 114 | 204.552 | 13.545 | 120.00 |
| 115 | 205.941 | 13.900 | 120.00 |
| 116 | 206.914 | 14.131 | 120.00 |
| 117 | 208.446 | 14.462 | 120.00 |
| 118 | 210.067 | 14.764 | 120.00 |
| 119 | 211.198 | 14.943 | 120.00 |
| 120 | 212.968 | 15.169 | 120.00 |
| 121 | 214.826 | 15.335 | 120.00 |
| 122 | 216.112 | 15.405 | 120.00 |
| 123 | 218.111 | 15.440 | 120.00 |
| 124 | 220.191 | 15.376 | 120.00 |
| 125 | 221.619 | 15.272 | 120.00 |
| 126 | 223.820 | 15.014 | 120.00 |
| 127 | 225.322 | 14.769 | 120.00 |
| 128 | 227.622 | 14.283 | 120.00 |
| 129 | 229.969 | 13.646 | 120.00 |
| 130 | 231.554 | 13.132 | 120.00 |
| 131 | 233.955 | 12.222 | 120.00 |
| 132 | 236.370 | 11.139 | 120.00 |
| 133 | 237.983 | 10.317 | 120.00 |
| 134 | 240.397 | 8.933 | 120.00 |
| 135 | 242.797 | 7.368 | 120.00 |
| 136 | 244.383 | 6.226 | 120.00 |
| 137 | 246.735 | 4.365 | 120.00 |
| 138 | 249.049 | 2.333 | 120.00 |
| 139 | 250.554 | 0.900 | 120.00 |
| 140 | 252.688 | −1.285 | 120.00 |
| 141 | 254.679 | −3.493 | 120.00 |
| 142 | 255.933 | −4.968 | 120.00 |
| 143 | 257.712 | −7.177 | 120.00 |
| 144 | 259.380 | −9.370 | 120.00 |
| 145 | 260.434 | −10.819 | 120.00 |
| 146 | 261.936 | −12.966 | 120.00 |
| 147 | 263.350 | −15.076 | 120.00 |
| 148 | 264.249 | −16.459 | 120.00 |
| 149 | 265.534 | −18.493 | 120.00 |
| 150 | 266.751 | −20.475 | 120.00 |
| 151 | 267.527 | −21.765 | 120.00 |
| 152 | 268.642 | −23.651 | 120.00 |
| 153 | 269.354 | −24.875 | 120.00 |
| 154 | 270.379 | −26.656 | 120.00 |
| 155 | 271.353 | −28.372 | 120.00 |
| 156 | 271.977 | −29.480 | 120.00 |
| 157 | 272.874 | −31.084 | 120.00 |
| 158 | 273.728 | −32.621 | 120.00 |
| 159 | 274.274 | −33.606 | 120.00 |
| 160 | 275.058 | −35.027 | 120.00 |
| 161 | 275.801 | −36.377 | 120.00 |
| 162 | 276.274 | −37.238 | 120.00 |
| 163 | 276.951 | −38.471 | 120.00 |
| 164 | 277.589 | −39.633 | 120.00 |
| 165 | 277.993 | −40.368 | 120.00 |
| 166 | 278.566 | −41.411 | 120.00 |
| 167 | 279.101 | −42.383 | 120.00 |
| 168 | 279.436 | −42.992 | 120.00 |
| 169 | 279.907 | −43.845 | 120.00 |
| 170 | 280.339 | −44.626 | 120.00 |
| 171 | 280.606 | −45.108 | 120.00 |
| 172 | 280.974 | −45.771 | 120.00 |
| 173 | 281.303 | −46.363 | 120.00 |

TABLE I-continued

| N | X | Y | Z |
|---|---|---|---|
| 174 | 281.501 | −46.718 | 120.00 |
| 175 | 281.765 | −47.192 | 120.00 |
| 176 | 281.919 | −47.468 | 120.00 |
| 177 | 282.057 | −47.678 | 120.00 |
| 178 | 282.207 | −47.855 | 120.00 |
| 179 | 282.382 | −48.018 | 120.00 |
| 180 | 282.605 | −48.179 | 120.00 |
| 181 | 282.822 | −48.298 | 120.00 |
| 182 | 283.054 | −48.388 | 120.00 |
| 183 | 283.329 | −48.452 | 120.00 |
| 184 | 283.575 | −48.475 | 120.00 |
| 185 | 283.819 | −48.467 | 120.00 |
| 186 | 284.055 | −48.431 | 120.00 |
| 187 | 284.305 | −48.362 | 120.00 |
| 188 | 284.509 | −48.276 | 120.00 |
| 189 | 284.702 | −48.166 | 120.00 |
| 190 | 284.910 | −48.010 | 120.00 |
| 191 | 285.083 | −47.845 | 120.00 |
| 192 | 285.239 | −47.656 | 120.00 |
| 193 | 285.372 | −47.446 | 120.00 |
| 194 | 285.488 | −47.190 | 120.00 |
| 195 | 285.558 | −46.951 | 120.00 |
| 196 | 285.597 | −46.706 | 120.00 |
| 197 | 285.605 | −46.433 | 120.00 |
| 198 | 285.582 | −46.195 | 120.00 |
| 199 | 285.535 | −45.969 | 120.00 |
| 200 | 285.463 | −45.758 | 120.00 |
| 1 | 285.148 | −44.190 | 135.00 |
| 2 | 284.928 | −43.640 | 135.00 |
| 3 | 284.670 | −43.000 | 135.00 |
| 4 | 284.477 | −42.523 | 135.00 |
| 5 | 284.156 | −41.731 | 135.00 |
| 6 | 283.797 | −40.850 | 135.00 |
| 7 | 283.536 | −40.212 | 135.00 |
| 8 | 283.112 | −39.180 | 135.00 |
| 9 | 282.650 | −38.057 | 135.00 |
| 10 | 282.320 | −37.258 | 135.00 |
| 11 | 281.795 | −35.985 | 135.00 |
| 12 | 281.232 | −34.620 | 135.00 |
| 13 | 280.835 | −33.660 | 135.00 |
| 14 | 280.207 | −32.145 | 135.00 |
| 15 | 279.539 | −30.541 | 135.00 |
| 16 | 279.071 | −29.422 | 135.00 |
| 17 | 278.332 | −27.669 | 135.00 |
| 18 | 277.549 | −25.829 | 135.00 |
| 19 | 277.001 | −24.554 | 135.00 |
| 20 | 276.140 | −22.569 | 135.00 |
| 21 | 275.228 | −20.499 | 135.00 |
| 22 | 274.591 | −19.072 | 135.00 |
| 23 | 273.590 | −16.863 | 135.00 |
| 24 | 272.530 | −14.573 | 135.00 |
| 25 | 271.790 | −13.002 | 135.00 |
| 26 | 270.625 | −10.580 | 135.00 |
| 27 | 269.810 | −8.924 | 135.00 |
| 28 | 268.528 | −6.377 | 135.00 |
| 29 | 267.167 | −3.761 | 135.00 |
| 30 | 266.214 | −1.979 | 135.00 |
| 31 | 264.710 | 0.747 | 135.00 |
| 32 | 263.107 | 3.530 | 135.00 |
| 33 | 261.979 | 5.414 | 135.00 |
| 34 | 260.189 | 8.275 | 135.00 |
| 35 | 258.267 | 11.168 | 135.00 |
| 36 | 256.906 | 13.107 | 135.00 |
| 37 | 254.729 | 16.019 | 135.00 |
| 38 | 252.374 | 18.917 | 135.00 |
| 39 | 250.709 | 20.809 | 135.00 |
| 40 | 248.139 | 23.475 | 135.00 |
| 41 | 245.485 | 25.912 | 135.00 |
| 42 | 243.667 | 27.397 | 135.00 |
| 43 | 240.872 | 29.399 | 135.00 |
| 44 | 238.003 | 31.110 | 135.00 |
| 45 | 236.059 | 32.079 | 135.00 |
| 46 | 233.111 | 33.264 | 135.00 |
| 47 | 230.155 | 34.124 | 135.00 |
| 48 | 228.196 | 34.518 | 135.00 |
| 49 | 225.301 | 34.853 | 135.00 |
| 50 | 222.487 | 34.903 | 135.00 |
| 51 | 220.667 | 34.796 | 135.00 |
| 52 | 218.033 | 34.454 | 135.00 |
| 53 | 216.347 | 34.121 | 135.00 |
| 54 | 213.935 | 33.489 | 135.00 |
| 55 | 211.668 | 32.724 | 135.00 |
| 56 | 210.236 | 32.156 | 135.00 |
| 57 | 208.206 | 31.236 | 135.00 |
| 58 | 206.317 | 30.252 | 135.00 |
| 59 | 205.134 | 29.569 | 135.00 |
| 60 | 203.471 | 28.517 | 135.00 |
| 61 | 201.942 | 27.442 | 135.00 |
| 62 | 200.996 | 26.717 | 135.00 |
| 63 | 199.683 | 25.624 | 135.00 |
| 64 | 198.498 | 24.535 | 135.00 |
| 65 | 197.779 | 23.814 | 135.00 |
| 66 | 196.807 | 22.749 | 135.00 |
| 67 | 195.957 | 21.710 | 135.00 |
| 68 | 195.457 | 21.036 | 135.00 |
| 69 | 194.797 | 20.058 | 135.00 |
| 70 | 194.237 | 19.131 | 135.00 |
| 71 | 193.913 | 18.546 | 135.00 |
| 72 | 193.493 | 17.728 | 135.00 |
| 73 | 193.149 | 16.982 | 135.00 |
| 74 | 192.959 | 16.527 | 135.00 |
| 75 | 192.729 | 15.912 | 135.00 |
| 76 | 192.609 | 15.548 | 135.00 |
| 77 | 192.556 | 15.357 | 135.00 |
| 78 | 192.515 | 15.160 | 135.00 |
| 79 | 192.487 | 14.956 | 135.00 |
| 80 | 192.473 | 14.747 | 135.00 |
| 81 | 192.475 | 14.534 | 135.00 |
| 82 | 192.494 | 14.320 | 135.00 |
| 83 | 192.531 | 14.105 | 135.00 |
| 84 | 192.585 | 13.892 | 135.00 |
| 85 | 192.657 | 13.684 | 135.00 |
| 86 | 192.747 | 13.481 | 135.00 |
| 87 | 192.855 | 13.287 | 135.00 |
| 88 | 192.981 | 13.104 | 135.00 |
| 89 | 193.124 | 12.933 | 135.00 |
| 90 | 193.282 | 12.776 | 135.00 |
| 91 | 193.453 | 12.635 | 135.00 |
| 92 | 193.636 | 12.510 | 135.00 |
| 93 | 193.829 | 12.403 | 135.00 |
| 94 | 194.028 | 12.312 | 135.00 |
| 95 | 194.233 | 12.238 | 135.00 |
| 96 | 194.441 | 12.182 | 135.00 |
| 97 | 194.649 | 12.142 | 135.00 |
| 98 | 194.857 | 12.119 | 135.00 |
| 99 | 195.062 | 12.110 | 135.00 |
| 100 | 195.263 | 12.115 | 135.00 |
| 101 | 195.435 | 12.130 | 135.00 |
| 102 | 195.912 | 12.202 | 135.00 |
| 103 | 196.460 | 12.323 | 135.00 |
| 104 | 196.865 | 12.431 | 135.00 |
| 105 | 197.532 | 12.631 | 135.00 |
| 106 | 198.275 | 12.861 | 135.00 |
| 107 | 198.812 | 13.027 | 135.00 |
| 108 | 199.681 | 13.297 | 135.00 |
| 109 | 200.625 | 13.595 | 135.00 |
| 110 | 201.296 | 13.808 | 135.00 |
| 111 | 202.368 | 14.144 | 135.00 |
| 112 | 203.520 | 14.494 | 135.00 |
| 113 | 204.333 | 14.734 | 135.00 |
| 114 | 205.620 | 15.097 | 135.00 |
| 115 | 206.990 | 15.458 | 135.00 |
| 116 | 207.951 | 15.693 | 135.00 |
| 117 | 209.463 | 16.029 | 135.00 |
| 118 | 211.064 | 16.333 | 135.00 |
| 119 | 212.181 | 16.513 | 135.00 |
| 120 | 213.930 | 16.737 | 135.00 |
| 121 | 215.766 | 16.897 | 135.00 |
| 122 | 217.038 | 16.960 | 135.00 |
| 123 | 219.014 | 16.979 | 135.00 |
| 124 | 221.068 | 16.892 | 135.00 |
| 125 | 222.479 | 16.768 | 135.00 |
| 126 | 224.649 | 16.477 | 135.00 |
| 127 | 226.130 | 16.207 | 135.00 |

TABLE I-continued

| N | X | Y | Z |
|---|---|---|---|
| 128 | 228.394 | 15.683 | 135.00 |
| 129 | 230.701 | 15.009 | 135.00 |
| 130 | 232.259 | 14.472 | 135.00 |
| 131 | 234.617 | 13.531 | 135.00 |
| 132 | 236.990 | 12.422 | 135.00 |
| 133 | 238.573 | 11.587 | 135.00 |
| 134 | 240.943 | 10.190 | 135.00 |
| 135 | 243.297 | 8.617 | 135.00 |
| 136 | 244.851 | 7.471 | 135.00 |
| 137 | 247.153 | 5.608 | 135.00 |
| 138 | 249.418 | 3.576 | 135.00 |
| 139 | 250.891 | 2.144 | 135.00 |
| 140 | 252.979 | −0.038 | 135.00 |
| 141 | 254.926 | −2.241 | 135.00 |
| 142 | 256.152 | −3.711 | 135.00 |
| 143 | 257.891 | −5.909 | 135.00 |
| 144 | 259.521 | −8.088 | 135.00 |
| 145 | 260.552 | −9.526 | 135.00 |
| 146 | 262.023 | −11.655 | 135.00 |
| 147 | 263.409 | −13.747 | 135.00 |
| 148 | 264.290 | −15.118 | 135.00 |
| 149 | 265.553 | −17.135 | 135.00 |
| 150 | 266.748 | −19.099 | 135.00 |
| 151 | 267.511 | −20.378 | 135.00 |
| 152 | 268.607 | −22.246 | 135.00 |
| 153 | 269.308 | −23.457 | 135.00 |
| 154 | 270.315 | −25.222 | 135.00 |
| 155 | 271.273 | −26.921 | 135.00 |
| 156 | 271.885 | −28.018 | 135.00 |
| 157 | 272.766 | −29.608 | 135.00 |
| 158 | 273.602 | −31.130 | 135.00 |
| 159 | 274.136 | −32.108 | 135.00 |
| 160 | 274.903 | −33.516 | 135.00 |
| 161 | 275.629 | −34.855 | 135.00 |
| 162 | 276.092 | −35.709 | 135.00 |
| 163 | 276.753 | −36.932 | 135.00 |
| 164 | 277.375 | −38.084 | 135.00 |
| 165 | 277.769 | −38.814 | 135.00 |
| 166 | 278.328 | −39.849 | 135.00 |
| 167 | 278.849 | −40.814 | 135.00 |
| 168 | 279.175 | −41.418 | 135.00 |
| 169 | 279.633 | −42.265 | 135.00 |
| 170 | 280.053 | −43.041 | 135.00 |
| 171 | 280.313 | −43.519 | 135.00 |
| 172 | 280.670 | −44.178 | 135.00 |
| 173 | 280.990 | −44.766 | 135.00 |
| 174 | 281.182 | −45.119 | 135.00 |
| 175 | 281.439 | −45.589 | 135.00 |
| 176 | 281.589 | −45.864 | 135.00 |
| 177 | 281.724 | −46.075 | 135.00 |
| 178 | 281.873 | −46.253 | 135.00 |
| 179 | 282.046 | −46.418 | 135.00 |
| 180 | 282.267 | −46.582 | 135.00 |
| 181 | 282.482 | −46.702 | 135.00 |
| 182 | 282.714 | −46.795 | 135.00 |
| 183 | 282.987 | −46.862 | 135.00 |
| 184 | 283.234 | −46.887 | 135.00 |
| 185 | 283.478 | −46.881 | 135.00 |
| 186 | 283.714 | −46.847 | 135.00 |
| 187 | 283.964 | −46.781 | 135.00 |
| 188 | 284.169 | −46.697 | 135.00 |
| 189 | 284.363 | −46.589 | 135.00 |
| 190 | 284.573 | −46.435 | 135.00 |
| 191 | 284.747 | −46.272 | 135.00 |
| 192 | 284.905 | −46.085 | 135.00 |
| 193 | 285.040 | −45.877 | 135.00 |
| 194 | 285.158 | −45.621 | 135.00 |
| 195 | 285.231 | −45.383 | 135.00 |
| 196 | 285.272 | −45.139 | 135.00 |
| 197 | 285.282 | −44.866 | 135.00 |
| 198 | 285.262 | −44.628 | 135.00 |
| 199 | 285.217 | −44.401 | 135.00 |
| 200 | 285.148 | −44.190 | 135.00 |
| 1 | 284.945 | −42.327 | 150.00 |
| 2 | 284.730 | −41.785 | 150.00 |
| 3 | 284.479 | −41.153 | 150.00 |
| 4 | 284.291 | −40.682 | 150.00 |
| 5 | 283.976 | −39.902 | 150.00 |
| 6 | 283.624 | −39.033 | 150.00 |
| 7 | 283.368 | −38.404 | 150.00 |
| 8 | 282.952 | −37.387 | 150.00 |
| 9 | 282.498 | −36.280 | 150.00 |
| 10 | 282.175 | −35.493 | 150.00 |
| 11 | 281.660 | −34.237 | 150.00 |
| 12 | 281.108 | −32.892 | 150.00 |
| 13 | 280.720 | −31.945 | 150.00 |
| 14 | 280.106 | −30.451 | 150.00 |
| 15 | 279.452 | −28.869 | 150.00 |
| 16 | 278.994 | −27.765 | 150.00 |
| 17 | 278.272 | −26.036 | 150.00 |
| 18 | 277.506 | −24.221 | 150.00 |
| 19 | 276.970 | −22.963 | 150.00 |
| 20 | 276.128 | −21.006 | 150.00 |
| 21 | 275.236 | −18.964 | 150.00 |
| 22 | 274.612 | −17.557 | 150.00 |
| 23 | 273.632 | −15.378 | 150.00 |
| 24 | 272.594 | −13.119 | 150.00 |
| 25 | 271.869 | −11.570 | 150.00 |
| 26 | 270.728 | −9.181 | 150.00 |
| 27 | 269.930 | −7.547 | 150.00 |
| 28 | 268.674 | −5.035 | 150.00 |
| 29 | 267.341 | −2.453 | 150.00 |
| 30 | 266.407 | −0.695 | 150.00 |
| 31 | 264.932 | 1.994 | 150.00 |
| 32 | 263.359 | 4.739 | 150.00 |
| 33 | 262.251 | 6.597 | 150.00 |
| 34 | 260.490 | 9.417 | 150.00 |
| 35 | 258.596 | 12.266 | 150.00 |
| 36 | 257.252 | 14.174 | 150.00 |
| 37 | 255.101 | 17.036 | 150.00 |
| 38 | 252.769 | 19.882 | 150.00 |
| 39 | 251.120 | 21.737 | 150.00 |
| 40 | 248.577 | 24.351 | 150.00 |
| 41 | 245.954 | 26.741 | 150.00 |
| 42 | 244.160 | 28.200 | 150.00 |
| 43 | 241.407 | 30.172 | 150.00 |
| 44 | 238.586 | 31.867 | 150.00 |
| 45 | 236.677 | 32.833 | 150.00 |
| 46 | 233.783 | 34.026 | 150.00 |
| 47 | 230.881 | 34.907 | 150.00 |
| 48 | 228.957 | 35.322 | 150.00 |
| 49 | 226.110 | 35.697 | 150.00 |
| 50 | 223.339 | 35.795 | 150.00 |
| 51 | 221.544 | 35.724 | 150.00 |
| 52 | 218.942 | 35.439 | 150.00 |
| 53 | 217.275 | 35.143 | 150.00 |
| 54 | 214.887 | 34.564 | 150.00 |
| 55 | 212.640 | 33.849 | 150.00 |
| 56 | 211.220 | 33.311 | 150.00 |
| 57 | 209.210 | 32.430 | 150.00 |
| 58 | 207.340 | 31.477 | 150.00 |
| 59 | 206.171 | 30.812 | 150.00 |
| 60 | 204.531 | 29.780 | 150.00 |
| 61 | 203.026 | 28.718 | 150.00 |
| 62 | 202.096 | 28.000 | 150.00 |
| 63 | 200.809 | 26.917 | 150.00 |
| 64 | 199.650 | 25.834 | 150.00 |
| 65 | 198.948 | 25.118 | 150.00 |
| 66 | 197.999 | 24.061 | 150.00 |
| 67 | 197.169 | 23.031 | 150.00 |
| 68 | 196.680 | 22.364 | 150.00 |
| 69 | 196.034 | 21.398 | 150.00 |
| 70 | 195.484 | 20.484 | 150.00 |
| 71 | 195.163 | 19.909 | 150.00 |
| 72 | 194.744 | 19.106 | 150.00 |
| 73 | 194.397 | 18.375 | 150.00 |
| 74 | 194.204 | 17.930 | 150.00 |
| 75 | 193.970 | 17.327 | 150.00 |
| 76 | 193.847 | 16.969 | 150.00 |
| 77 | 193.791 | 16.779 | 150.00 |
| 78 | 193.747 | 16.581 | 150.00 |
| 79 | 193.716 | 16.377 | 150.00 |
| 80 | 193.699 | 16.168 | 150.00 |
| 81 | 193.698 | 15.956 | 150.00 |

TABLE I-continued

| N | X | Y | Z |
|---|---|---|---|
| 82 | 193.713 | 15.741 | 150.00 |
| 83 | 193.747 | 15.527 | 150.00 |
| 84 | 193.798 | 15.314 | 150.00 |
| 85 | 193.868 | 15.105 | 150.00 |
| 86 | 193.955 | 14.902 | 150.00 |
| 87 | 194.061 | 14.707 | 150.00 |
| 88 | 194.185 | 14.524 | 150.00 |
| 89 | 194.326 | 14.352 | 150.00 |
| 90 | 194.482 | 14.195 | 150.00 |
| 91 | 194.652 | 14.053 | 150.00 |
| 92 | 194.833 | 13.927 | 150.00 |
| 93 | 195.024 | 13.818 | 150.00 |
| 94 | 195.222 | 13.725 | 150.00 |
| 95 | 195.426 | 13.650 | 150.00 |
| 96 | 195.633 | 13.591 | 150.00 |
| 97 | 195.841 | 13.550 | 150.00 |
| 98 | 196.049 | 13.524 | 150.00 |
| 99 | 196.254 | 13.514 | 150.00 |
| 100 | 196.456 | 13.517 | 150.00 |
| 101 | 196.629 | 13.531 | 150.00 |
| 102 | 197.099 | 13.600 | 150.00 |
| 103 | 197.640 | 13.718 | 150.00 |
| 104 | 198.039 | 13.826 | 150.00 |
| 105 | 198.697 | 14.026 | 150.00 |
| 106 | 199.429 | 14.256 | 150.00 |
| 107 | 199.958 | 14.422 | 150.00 |
| 108 | 200.815 | 14.691 | 150.00 |
| 109 | 201.745 | 14.986 | 150.00 |
| 110 | 202.408 | 15.197 | 150.00 |
| 111 | 203.465 | 15.529 | 150.00 |
| 112 | 204.602 | 15.875 | 150.00 |
| 113 | 205.404 | 16.110 | 150.00 |
| 114 | 206.674 | 16.467 | 150.00 |
| 115 | 208.027 | 16.820 | 150.00 |
| 116 | 208.975 | 17.049 | 150.00 |
| 117 | 210.468 | 17.375 | 150.00 |
| 118 | 212.049 | 17.670 | 150.00 |
| 119 | 213.151 | 17.843 | 150.00 |
| 120 | 214.878 | 18.057 | 150.00 |
| 121 | 216.691 | 18.207 | 150.00 |
| 122 | 217.945 | 18.263 | 150.00 |
| 123 | 219.895 | 18.272 | 150.00 |
| 124 | 221.922 | 18.175 | 150.00 |
| 125 | 223.313 | 18.044 | 150.00 |
| 126 | 225.453 | 17.743 | 150.00 |
| 127 | 226.912 | 17.468 | 150.00 |
| 128 | 229.143 | 16.938 | 150.00 |
| 129 | 231.416 | 16.260 | 150.00 |
| 130 | 232.951 | 15.723 | 150.00 |
| 131 | 235.274 | 14.785 | 150.00 |
| 132 | 237.612 | 13.683 | 150.00 |
| 133 | 239.174 | 12.856 | 150.00 |
| 134 | 241.511 | 11.474 | 150.00 |
| 135 | 243.832 | 9.920 | 150.00 |
| 136 | 245.363 | 8.789 | 150.00 |
| 137 | 247.632 | 6.951 | 150.00 |
| 138 | 249.865 | 4.944 | 150.00 |
| 139 | 251.318 | 3.529 | 150.00 |
| 140 | 253.375 | 1.372 | 150.00 |
| 141 | 255.292 | −0.805 | 150.00 |
| 142 | 256.498 | −2.259 | 150.00 |
| 143 | 258.207 | −4.433 | 150.00 |
| 144 | 259.809 | −6.588 | 150.00 |
| 145 | 260.821 | −8.010 | 150.00 |
| 146 | 262.265 | −10.116 | 150.00 |
| 147 | 263.625 | −12.185 | 150.00 |
| 148 | 264.489 | −13.541 | 150.00 |
| 149 | 265.727 | −15.535 | 150.00 |
| 150 | 266.899 | −17.478 | 150.00 |
| 151 | 267.646 | −18.743 | 150.00 |
| 152 | 268.720 | −20.591 | 150.00 |
| 153 | 269.405 | −21.790 | 150.00 |
| 154 | 270.391 | −23.535 | 150.00 |
| 155 | 271.327 | −25.217 | 150.00 |
| 156 | 271.925 | −26.303 | 150.00 |
| 157 | 272.785 | −27.876 | 150.00 |
| 158 | 273.600 | −29.384 | 150.00 |
| 159 | 274.121 | −30.351 | 150.00 |
| 160 | 274.868 | −31.746 | 150.00 |
| 161 | 275.575 | −33.072 | 150.00 |
| 162 | 276.026 | −33.918 | 150.00 |
| 163 | 276.669 | −35.129 | 150.00 |
| 164 | 277.274 | −36.271 | 150.00 |
| 165 | 277.657 | −36.993 | 150.00 |
| 166 | 278.201 | −38.019 | 150.00 |
| 167 | 278.707 | −38.975 | 150.00 |
| 168 | 279.024 | −39.574 | 150.00 |
| 169 | 279.470 | −40.413 | 150.00 |
| 170 | 279.878 | −41.182 | 150.00 |
| 171 | 280.130 | −41.656 | 150.00 |
| 172 | 280.477 | −42.309 | 150.00 |
| 173 | 280.788 | −42.892 | 150.00 |
| 174 | 280.975 | −43.242 | 150.00 |
| 175 | 281.224 | −43.708 | 150.00 |
| 176 | 281.369 | −43.981 | 150.00 |
| 177 | 281.503 | −44.193 | 150.00 |
| 178 | 281.651 | −44.373 | 150.00 |
| 179 | 281.823 | −44.540 | 150.00 |
| 180 | 282.043 | −44.706 | 150.00 |
| 181 | 282.258 | −44.829 | 150.00 |
| 182 | 282.490 | −44.923 | 150.00 |
| 183 | 282.764 | −44.992 | 150.00 |
| 184 | 283.011 | −45.019 | 150.00 |
| 185 | 283.255 | −45.015 | 150.00 |
| 186 | 283.492 | −44.983 | 150.00 |
| 187 | 283.744 | −44.918 | 150.00 |
| 188 | 283.950 | −44.836 | 150.00 |
| 189 | 284.145 | −44.729 | 150.00 |
| 190 | 284.356 | −44.576 | 150.00 |
| 191 | 284.532 | −44.413 | 150.00 |
| 192 | 284.691 | −44.226 | 150.00 |
| 193 | 284.828 | −44.018 | 150.00 |
| 194 | 284.948 | −43.763 | 150.00 |
| 195 | 285.022 | −43.524 | 150.00 |
| 196 | 285.065 | −43.280 | 150.00 |
| 197 | 285.077 | −43.005 | 150.00 |
| 198 | 285.058 | −42.767 | 150.00 |
| 199 | 285.013 | −42.539 | 150.00 |
| 200 | 284.945 | −42.327 | 150.00 |
| 1 | 284.937 | −39.980 | 165.00 |
| 2 | 284.724 | −39.450 | 165.00 |
| 3 | 284.474 | −38.831 | 165.00 |
| 4 | 284.288 | −38.370 | 165.00 |
| 5 | 283.979 | −37.606 | 165.00 |
| 6 | 283.632 | −36.754 | 165.00 |
| 7 | 283.381 | −36.138 | 165.00 |
| 8 | 282.974 | −35.140 | 165.00 |
| 9 | 282.529 | −34.056 | 165.00 |
| 10 | 282.211 | −33.284 | 165.00 |
| 11 | 281.704 | −32.054 | 165.00 |
| 12 | 281.159 | −30.737 | 165.00 |
| 13 | 280.774 | −29.811 | 165.00 |
| 14 | 280.164 | −28.350 | 165.00 |
| 15 | 279.514 | −26.802 | 165.00 |
| 16 | 279.058 | −25.723 | 165.00 |
| 17 | 278.339 | −24.033 | 165.00 |
| 18 | 277.576 | −22.259 | 165.00 |
| 19 | 277.043 | −21.030 | 165.00 |
| 20 | 276.204 | −19.116 | 165.00 |
| 21 | 275.317 | −17.120 | 165.00 |
| 22 | 274.698 | −15.744 | 165.00 |
| 23 | 273.725 | −13.614 | 165.00 |
| 24 | 272.696 | −11.405 | 165.00 |
| 25 | 271.977 | −9.889 | 165.00 |
| 26 | 270.846 | −7.554 | 165.00 |
| 27 | 270.056 | −5.956 | 165.00 |
| 28 | 268.811 | −3.501 | 165.00 |
| 29 | 267.489 | −0.977 | 165.00 |
| 30 | 266.563 | 0.740 | 165.00 |
| 31 | 265.098 | 3.365 | 165.00 |
| 32 | 263.534 | 6.044 | 165.00 |
| 33 | 262.433 | 7.856 | 165.00 |
| 34 | 260.682 | 10.607 | 165.00 |
| 35 | 258.802 | 13.384 | 165.00 |

TABLE I-continued

| N | X | Y | Z |
|---|---|---|---|
| 36 | 257.468 | 15.243 | 165.00 |
| 37 | 255.337 | 18.032 | 165.00 |
| 38 | 253.030 | 20.803 | 165.00 |
| 39 | 251.402 | 22.611 | 165.00 |
| 40 | 248.892 | 25.159 | 165.00 |
| 41 | 246.307 | 27.491 | 165.00 |
| 42 | 244.543 | 28.915 | 165.00 |
| 43 | 241.840 | 30.843 | 165.00 |
| 44 | 239.076 | 32.505 | 165.00 |
| 45 | 237.207 | 33.458 | 165.00 |
| 46 | 234.377 | 34.644 | 165.00 |
| 47 | 231.540 | 35.531 | 165.00 |
| 48 | 229.657 | 35.957 | 165.00 |
| 49 | 226.871 | 36.354 | 165.00 |
| 50 | 224.154 | 36.479 | 165.00 |
| 51 | 222.394 | 36.426 | 165.00 |
| 52 | 219.845 | 36.164 | 165.00 |
| 53 | 218.213 | 35.882 | 165.00 |
| 54 | 215.876 | 35.322 | 165.00 |
| 55 | 213.674 | 34.623 | 165.00 |
| 56 | 212.282 | 34.095 | 165.00 |
| 57 | 210.311 | 33.229 | 165.00 |
| 58 | 208.479 | 32.290 | 165.00 |
| 59 | 207.334 | 31.633 | 165.00 |
| 60 | 205.730 | 30.614 | 165.00 |
| 61 | 204.259 | 29.568 | 165.00 |
| 62 | 203.351 | 28.861 | 165.00 |
| 63 | 202.094 | 27.797 | 165.00 |
| 64 | 200.959 | 26.737 | 165.00 |
| 65 | 200.269 | 26.039 | 165.00 |
| 66 | 199.330 | 25.010 | 165.00 |
| 67 | 198.502 | 24.010 | 165.00 |
| 68 | 198.008 | 23.365 | 165.00 |
| 69 | 197.350 | 22.435 | 165.00 |
| 70 | 196.781 | 21.557 | 165.00 |
| 71 | 196.448 | 21.005 | 165.00 |
| 72 | 196.010 | 20.231 | 165.00 |
| 73 | 195.646 | 19.526 | 165.00 |
| 74 | 195.446 | 19.095 | 165.00 |
| 75 | 195.203 | 18.510 | 165.00 |
| 76 | 195.076 | 18.161 | 165.00 |
| 77 | 195.017 | 17.969 | 165.00 |
| 78 | 194.970 | 17.769 | 165.00 |
| 79 | 194.935 | 17.563 | 165.00 |
| 80 | 194.915 | 17.352 | 165.00 |
| 81 | 194.910 | 17.138 | 165.00 |
| 82 | 194.922 | 16.922 | 165.00 |
| 83 | 194.952 | 16.705 | 165.00 |
| 84 | 195.001 | 16.491 | 165.00 |
| 85 | 195.069 | 16.280 | 165.00 |
| 86 | 195.155 | 16.075 | 165.00 |
| 87 | 195.260 | 15.880 | 165.00 |
| 88 | 195.383 | 15.695 | 165.00 |
| 89 | 195.523 | 15.522 | 165.00 |
| 90 | 195.680 | 15.364 | 165.00 |
| 91 | 195.849 | 15.221 | 165.00 |
| 92 | 196.031 | 15.094 | 165.00 |
| 93 | 196.221 | 14.983 | 165.00 |
| 94 | 196.420 | 14.888 | 165.00 |
| 95 | 196.624 | 14.811 | 165.00 |
| 96 | 196.832 | 14.751 | 165.00 |
| 97 | 197.042 | 14.708 | 165.00 |
| 98 | 197.252 | 14.681 | 165.00 |
| 99 | 197.460 | 14.669 | 165.00 |
| 100 | 197.665 | 14.672 | 165.00 |
| 101 | 197.840 | 14.685 | 165.00 |
| 102 | 198.302 | 14.754 | 165.00 |
| 103 | 198.831 | 14.877 | 165.00 |
| 104 | 199.222 | 14.991 | 165.00 |
| 105 | 199.865 | 15.201 | 165.00 |
| 106 | 200.582 | 15.438 | 165.00 |
| 107 | 201.101 | 15.606 | 165.00 |
| 108 | 201.943 | 15.872 | 165.00 |
| 109 | 202.860 | 16.159 | 165.00 |
| 110 | 203.512 | 16.362 | 165.00 |
| 111 | 204.556 | 16.677 | 165.00 |
| 112 | 205.679 | 16.999 | 165.00 |
| 113 | 206.472 | 17.216 | 165.00 |
| 114 | 207.728 | 17.540 | 165.00 |
| 115 | 209.066 | 17.857 | 165.00 |
| 116 | 210.004 | 18.060 | 165.00 |
| 117 | 211.480 | 18.348 | 165.00 |
| 118 | 213.041 | 18.606 | 165.00 |
| 119 | 214.128 | 18.756 | 165.00 |
| 120 | 215.830 | 18.941 | 165.00 |
| 121 | 217.614 | 19.069 | 165.00 |
| 122 | 218.849 | 19.117 | 165.00 |
| 123 | 220.767 | 19.121 | 165.00 |
| 124 | 222.761 | 19.034 | 165.00 |
| 125 | 224.130 | 18.918 | 165.00 |
| 126 | 226.238 | 18.650 | 165.00 |
| 127 | 227.677 | 18.402 | 165.00 |
| 128 | 229.879 | 17.920 | 165.00 |
| 129 | 232.127 | 17.296 | 165.00 |
| 130 | 233.646 | 16.798 | 165.00 |
| 131 | 235.947 | 15.920 | 165.00 |
| 132 | 238.264 | 14.881 | 165.00 |
| 133 | 239.813 | 14.096 | 165.00 |
| 134 | 242.133 | 12.777 | 165.00 |
| 135 | 244.441 | 11.287 | 165.00 |
| 136 | 245.968 | 10.200 | 165.00 |
| 137 | 248.231 | 8.428 | 165.00 |
| 138 | 250.460 | 6.489 | 165.00 |
| 139 | 251.909 | 5.119 | 165.00 |
| 140 | 253.960 | 3.027 | 165.00 |
| 141 | 255.870 | 0.910 | 165.00 |
| 142 | 257.070 | −0.508 | 165.00 |
| 143 | 258.770 | −2.632 | 165.00 |
| 144 | 260.358 | −4.745 | 165.00 |
| 145 | 261.360 | −6.143 | 165.00 |
| 146 | 262.785 | −8.215 | 165.00 |
| 147 | 264.123 | −10.251 | 165.00 |
| 148 | 264.971 | −11.586 | 165.00 |
| 149 | 266.181 | −13.550 | 165.00 |
| 150 | 267.324 | −15.465 | 165.00 |
| 151 | 268.051 | −16.712 | 165.00 |
| 152 | 269.094 | −18.536 | 165.00 |
| 153 | 269.759 | −19.719 | 165.00 |
| 154 | 270.713 | −21.443 | 165.00 |
| 155 | 271.620 | −23.105 | 165.00 |
| 156 | 272.198 | −24.177 | 165.00 |
| 157 | 273.030 | −25.732 | 165.00 |
| 158 | 273.820 | −27.221 | 165.00 |
| 159 | 274.324 | −28.177 | 165.00 |
| 160 | 275.047 | −29.555 | 165.00 |
| 161 | 275.732 | −30.865 | 165.00 |
| 162 | 276.167 | −31.701 | 165.00 |
| 163 | 276.790 | −32.898 | 165.00 |
| 164 | 277.376 | −34.026 | 165.00 |
| 165 | 277.747 | −34.739 | 165.00 |
| 166 | 278.273 | −35.753 | 165.00 |
| 167 | 278.764 | −36.697 | 165.00 |
| 168 | 279.071 | −37.288 | 165.00 |
| 169 | 279.502 | −38.117 | 165.00 |
| 170 | 279.898 | −38.877 | 165.00 |
| 171 | 280.142 | −39.345 | 165.00 |
| 172 | 280.479 | −39.990 | 165.00 |
| 173 | 280.780 | −40.565 | 165.00 |
| 174 | 280.961 | −40.911 | 165.00 |
| 175 | 281.203 | −41.371 | 165.00 |
| 176 | 281.344 | −41.640 | 165.00 |
| 177 | 281.477 | −41.856 | 165.00 |
| 178 | 281.625 | −42.038 | 165.00 |
| 179 | 281.798 | −42.208 | 165.00 |
| 180 | 282.019 | −42.376 | 165.00 |
| 181 | 282.236 | −42.501 | 165.00 |
| 182 | 282.469 | −42.597 | 165.00 |
| 183 | 282.745 | −42.668 | 165.00 |
| 184 | 282.994 | −42.696 | 165.00 |
| 185 | 283.241 | −42.692 | 165.00 |
| 186 | 283.481 | −42.660 | 165.00 |
| 187 | 283.734 | −42.595 | 165.00 |
| 188 | 283.942 | −42.512 | 165.00 |
| 189 | 284.139 | −42.404 | 165.00 |

TABLE I-continued

| N | X | Y | Z |
|---|---|---|---|
| 190 | 284.352 | −42.250 | 165.00 |
| 191 | 284.529 | −42.085 | 165.00 |
| 192 | 284.690 | −41.896 | 165.00 |
| 193 | 284.827 | −41.686 | 165.00 |
| 194 | 284.948 | −41.428 | 165.00 |
| 195 | 285.022 | −41.187 | 165.00 |
| 196 | 285.063 | −40.940 | 165.00 |
| 197 | 285.074 | −40.663 | 165.00 |
| 198 | 285.054 | −40.423 | 165.00 |
| 199 | 285.007 | −40.193 | 165.00 |
| 200 | 284.937 | −39.980 | 165.00 |

It will also be appreciated that the airfoil disclosed in the above Table I may be scaled up or down geometrically for use in other similar turbine designs. Consequently, the coordinate values set forth in Table I may be scaled upwardly or downwardly such that the airfoil section shape remains unchanged. A scaled version of the coordinates in Table I could be represented by X, Y and Z coordinate values multiplied or divided by the same constant or number. Similarly, a scaled version of the airfoil profiles could be represented by the X and Y coordinate values multiplied or divided by a constant.

Figure 4:
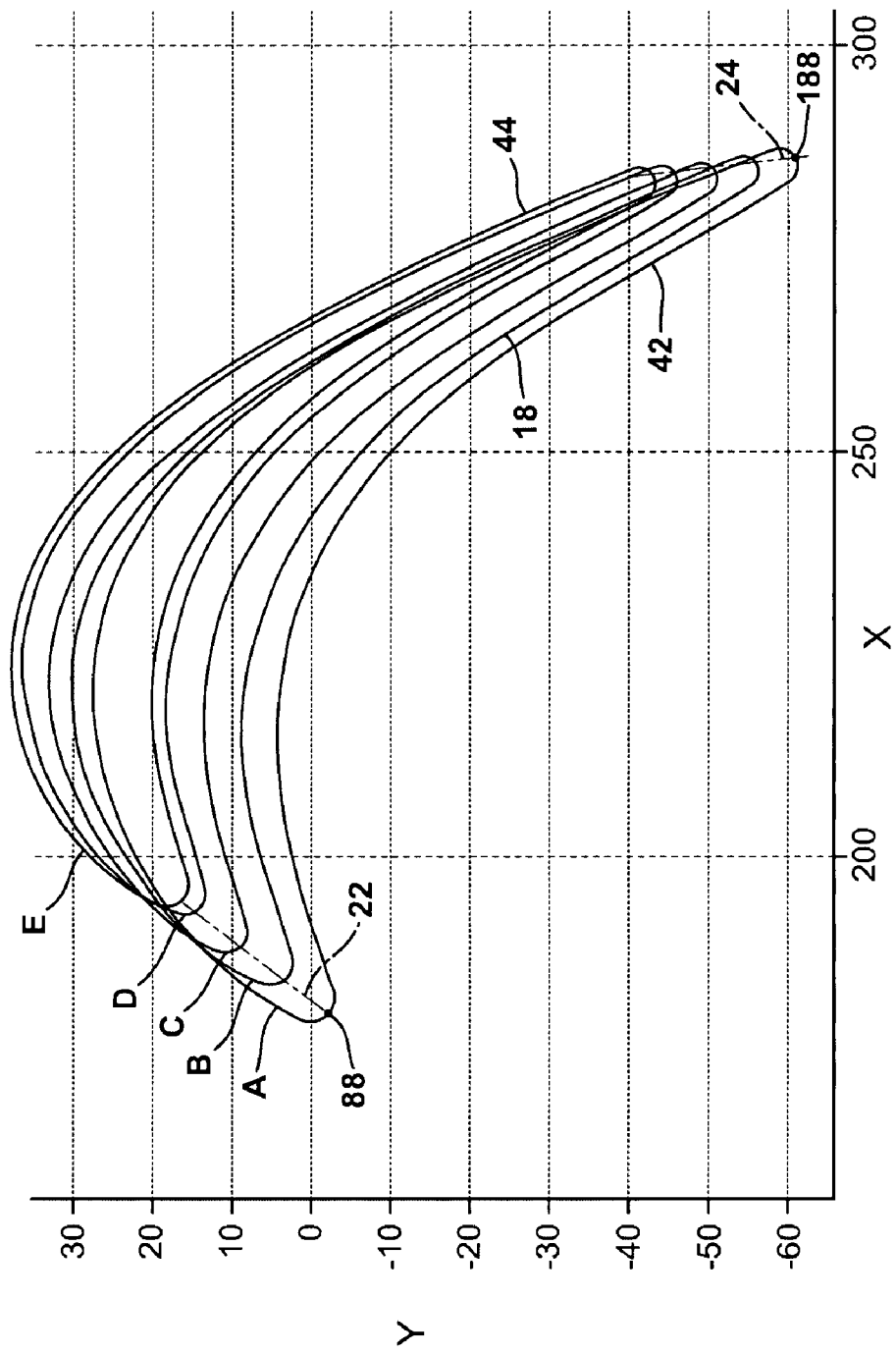
FIG. 4 is a composite plan view illustrating the outer contour of five sections of the airfoil for the turbine blade.

As may be seen in FIGS. 2 and 4, the leading edge 22 and trailing edge 24 are formed as substantially straight edges. That is, the leading and trailing edges 22, 24 are formed without substantial twisting or bowing along the spanwise height of the airfoil 12. The surfaces of the pressure and suction sides 18, 20 adjacent the trailing edge 24 comprise substantially planar portions 42, 44 (FIG. 4). In particular, a trailing edge portion of the airfoil 12, as defined by point locations, N, 1-11 and 162-199 in Table I, comprise the substantially straight trailing edge 24 and the substantially planar portions 42, 44. The substantially straight trailing edge 24 and substantially planar portions 42, 44 permit the airfoil 12, and in particular the trailing edge 24, to be constructed with complex cooling circuit passages, which construction may not be feasible in blades having bowed outer wall configurations. Specifically, a ceramic core is used to form the cooling circuit passages within the trailing edge 24, where complex cooling circuit passages require a ceramic core having relatively intricate passages. Manufacture of turbine blades by casting using a ceramic core is generally well known in the art, as is described, for example, in U.S. Pat. No. 7,014,424, which patent is incorporated herein by reference. The increased complexity in the passages, in combination with a curved configuration required by a curved blade structure, such as is commonly found in prior art turbine blade structures, results in a ceramic core that is highly susceptible to fracture, particularly during casting and firing processes for manufacture of the ceramic core. Accordingly, the turbine blade 10 of the present invention, providing a substantially straight trailing edge 24, facilitates implementation of a ceramic core that is less likely to break.

In addition, the substantially straight edge design facilitates a reduction in the growth of the turbine blade 10 during engine operation. In particular, as a result of providing a straight configuration to the thin sectional properties of the trailing edge 24, local creep of the metal forming the trailing edge may be reduced, especially during a thermal transient cycle of the engine. As a result of the reduced thermal creep, it is possible to design the airfoil with reduced clearance between the blade tip 28 and an adjacent stationary sealing surface, thus generally reducing leakage past the blade tip 28 and facilitating improved turbine performance.

In a similar manner, the straight edge configuration of the leading edge 22 may simplify the manufacturing process, permitting usage of a ceramic core that incorporates a complex cooling circuit design, and that may also simplify formation of leading edge cooling shower holes in the leading edge 22. As specified in Table I, the leading edge 22 and trailing edge 24 are generally defined along lines substantially corresponding to point locations, N, 88 and 188, respectively, taken at each of the Z coordinate values. The leading edge point locations, N, 88 and trailing edge point locations, N, 188 for sections corresponding to Z=0.00, 45.00, 90.00, 135.00 and 165.00 illustrate the leading edge 22 and trailing edge 24 in FIG. 4, where the profile sections Z=0.00, 45.00, 90.00, 135.00 and 165.00 are identified as sections A, B, C, D and E, respectively.

The straight leading edge and trailing edge configuration of the blade 10 provides a generally stiffer airfoil structure that permits use of fragile ceramic cores, and thereby reduces casting problems during manufacture of the blade 10. Accordingly, the blade 10 described herein provides an airfoil 12 capable of incorporating an intricate internal cooling geometry, as provided by the unique aero shape described in Table I, by facilitating manufacturing while also incorporating structural advantages improving turbine performance.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine blade including an airfoil, said airfoil having an uncoated nominal profile substantially in accordance with Cartesian coordinate values of X, Y and Z set forth in millimeters in Table 1 wherein Z is a perpendicular distance from a plane containing said X and Y values with said Z value commencing at zero in said X, Y plane at a radially innermost aerodynamic section of said airfoil and X and Y are coordinate values defining said airfoil profile at each distance Z which, when connected by smooth continuing arcs, define profile sections at each distance Z, said profile sections at said Z distances being joined smoothly with one another to form the complete airfoil shape and wherein said airfoil shape is defined in an envelope within about 1% of a maximum Z value in a direction normal to any airfoil surface location.

2. The turbine blade of claim 1, wherein said coordinate values of X, Y and Z represent scaled values and that may be multiplied by a selected constant to define a scaled-up or scaled-down airfoil.

3. The turbine blade of claim 1, wherein said turbine blade forms part of a first stage of a turbine.

4. A turbine blade including an airfoil, said airfoil having an airfoil shape wherein said airfoil has an uncoated nominal profile substantially in accordance with Cartesian coordinate values of X, Y and Z set forth in Table 1 wherein said X, Y and Z coordinate values represent scaled values and Z represents a perpendicular distance from a plane containing said X and Y values with said Z value commencing at zero in said X, Y plane at a radially innermost aerodynamic section of said airfoil and X and Y represent coordinate values defining said airfoil profile at each distance Z which, when connected by smooth continuing arcs, define profile sections at each distance Z, the profile sections at said Z distances being joined smoothly with one another to form the complete airfoil shape.

5. The turbine blade of claim 4, wherein said Cartesian coordinate values of X, Y and Z set forth in Table 1 comprise values given in millimeters.

6. The turbine blade of claim 5, wherein said airfoil shape is formed in an envelope within about 1% of a maximum Z value in a direction normal to any airfoil surface location.

7. The turbine blade of claim 4, wherein said turbine blade forms part of a first stage of a turbine.

8. A turbine blade comprising:
an airfoil including an airfoil outer wall extending radially outwardly from a blade root;
a blade tip surface located at an end of said airfoil distal from said root, and including a pressure side and a suction side joined together at chordally spaced apart leading and trailing edges of said airfoil;
a trailing edge portion comprising said trailing edge and adjacent portions of said pressure sidewall and said suction sidewall is defined by a spanwise loci of points located in a substantially straight formation, from a location adjacent said blade root to a location adjacent said blade tip surface wherein said spanwise loci of points defining said trailing edge portion is substantially in accordance with Cartesian coordinate values of X, Y and Z as specified by point locations, N, 1-11 and 162-199 at each value of Z in Table I wherein said X, Y and Z coordinate values represent scaled values and Z is a perpendicular distance from a plane containing said X and Y values with said Z value commencing at zero in said X, Y plane at a radially innermost aerodynamic section of said airfoil, and X and Y are coordinate values defining the profile of said trailing edge portion at each distance Z which, when connected by smooth continuing arcs, define trailing edge portion profile sections at each distance Z, said profile sections at said Z distances being joined smoothly with one another to form the complete trailing edge portion shape.

9. The turbine blade of claim 8, wherein said Cartesian coordinate values of X, Y and Z comprise values given in millimeters.

10. The turbine blade of claim 9, wherein said trailing edge portion profile is formed in an envelope within about 1% of a maximum Z value in a direction normal to any airfoil surface location.

11. The turbine blade of claim 8, wherein said turbine blade forms part of a first stage of a turbine.

12. The turbine blade of claim 8, wherein said leading edge is defined by a loci of points located in a substantially straight formation from a location adjacent said blade root to a location adjacent said blade tip surface.

13. The turbine blade of claim 12, wherein a line along said leading edge is defined substantially in accordance with Cartesian coordinate values of X, Y and Z specified by point locations, N, 88 at each value of coordinate Z, as set forth as in Table I, wherein said X, Y and Z coordinate values represent scaled values and Z is a perpendicular distance from a plane containing said X and Y values with said Z value commencing at zero in said X, Y plane at a radially innermost aerodynamic section of said airfoil, and X and Y are coordinate values defining said line along said leading edge at each distance Z which, when joined smoothly with one another, form a continuous line in the spanwise direction.

14. The turbine blade of claim 13, wherein said Cartesian coordinate values of X, Y and Z comprise values given in millimeters.

15. The turbine blade of claim 13, wherein said trailing edge profile is formed in an envelope within about 1% of a maximum Z value in a direction normal to any airfoil surface location.

16. The turbine blade of claim 13, wherein said turbine blade forms part of a first stage of a turbine.

* * * * *